(12) United States Patent
Borghi et al.

(10) Patent No.: US 11,820,241 B2
(45) Date of Patent: Nov. 21, 2023

(54) BATTERY PACK ASSEMBLY

(71) Applicant: NIKOLA CORPORATION, Phoenix, AZ (US)

(72) Inventors: Cory Borghi, Phoenix, AZ (US); Michael Corona, Phoenix, AZ (US); Seth Derouen, Phoenix, AZ (US); Varoujan Sarkissian, Phoenix, AZ (US); Oliver Rene, Phoenix, AZ (US); Nicholas Smith, Phoenix, AZ (US); Wesley Thibault, Phoenix, AZ (US); Brent Wilderman, Phoenix, AZ (US); Nathan Schmidt, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 45 days.

(21) Appl. No.: 17/456,875

(22) Filed: Nov. 29, 2021

(65) Prior Publication Data

US 2022/0169125 A1    Jun. 2, 2022

Related U.S. Application Data

(63) Continuation-in-part of application No. 17/466,326, filed on Sep. 3, 2021, and a continuation-in-part of
(Continued)

(51) Int. Cl.
B60L 50/60         (2019.01)
(52) U.S. Cl.
CPC ................... B60L 50/66 (2019.02)
(58) Field of Classification Search
CPC ............................................. B60L 50/66
See application file for complete search history.

(56) References Cited

U.S. PATENT DOCUMENTS 4,365,681 A    12/1982  Singh
5,585,205 A    12/1996  Kochi
(Continued)

FOREIGN PATENT DOCUMENTS

CN    204249928    4/2015
CN    105438262    3/2016
(Continued)

OTHER PUBLICATIONS

International Search report and written Opinion dated Sep. 9, 2021 in PCT/US2021/032687.
(Continued)

*Primary Examiner* — Jared Fureman
*Assistant Examiner* — Duc M Pham
(74) *Attorney, Agent, or Firm* — Snell & Wilmer L.L.P.

(57) ABSTRACT

A battery pack assembly comprises a battery enclosure having a first side panel, a second side panel, a third side panel, a fourth side panel, a top panel, and a bottom panel defining a module containing volume. The battery pack assembly may contain a plurality of battery modules in the module containing volume, the plurality of battery modules having a first battery module, a second battery module, and a third battery module. The first battery module and the second battery module are positioned in a first orientation and stacked to form a column of battery modules and the third battery module is positioned in a second orientation and positioned adjacent to the column of battery modules.

20 Claims, 16 Drawing Sheets

Related U.S. Application Data application No. 17/403,179, filed on Aug. 16, 2021, now Pat. No. 11,279,243, said application No. 17/466,326 is a continuation of application No. 17/321,724, filed on May 17, 2021, now Pat. No. 11,124,076.

(60) Provisional application No. 63/119,401, filed on Nov. 30, 2020, provisional application No. 63/119,070, filed on Nov. 30, 2020.

(56) References Cited

U.S. PATENT DOCUMENTS

| | | | |
|---|---|---|---|
| 6,085,854 | A | 7/2000 | Nishikawa |
| 6,402,229 | B1 | 6/2002 | Suganuma |
| 6,843,524 | B2 | 1/2005 | Kitagawa |
| 7,393,016 | B2 | 7/2008 | Mitsui et al. |
| 7,641,012 | B2 | 1/2010 | Burns |
| 7,883,113 | B2 | 2/2011 | Yatsuda |
| 8,212,412 | B1 | 7/2012 | Benedict et al. |
| 8,540,259 | B1 | 9/2013 | Young et al. |
| 9,061,712 | B2 | 6/2015 | Patberg et al. |
| 9,937,801 | B2 * | 4/2018 | Kusumi ............... B60K 1/04 |
| 10,493,837 | B1 | 12/2019 | Angelo et al. |
| 11,043,714 | B2 | 6/2021 | Sloan et al. |
| 11,124,076 | B1 | 9/2021 | Borghi et al. |
| 11,279,243 | B1 | 3/2022 | Ashraf et al. |
| 2010/0025132 | A1 | 2/2010 | Hill et al. |
| 2010/0291418 | A1 * | 11/2010 | Zhou ............... H01M 50/204 429/96 |
| 2011/0049977 | A1 | 3/2011 | Onnerud et al. |
| 2012/0244398 | A1 | 9/2012 | Youngs et al. |
| 2012/0313439 | A1 | 12/2012 | Yamaguchi et al. |
| 2013/0113290 | A1 | 5/2013 | Sato et al. |
| 2013/0270028 | A1 | 10/2013 | Young et al. |
| 2014/0232184 | A1 | 8/2014 | Ukai |
| 2015/0243956 | A1 | 8/2015 | Loo et al. |
| 2018/0069425 | A1 | 3/2018 | Mastrandrea |
| 2018/0108891 | A1 * | 4/2018 | Fees ............... H01M 50/505 |
| 2019/0123542 | A1 | 4/2019 | Kambham |
| 2019/0255928 | A1 | 8/2019 | Erlacher |
| 2019/0334261 | A1 | 10/2019 | Fees et al. |
| 2020/0153219 | A1 * | 5/2020 | Baseri ............... H01M 10/4257 |
| 2020/0238808 | A1 | 7/2020 | Hung et al. |
| 2020/0239076 | A1 | 7/2020 | Milton et al. |
| 2021/0151726 | A1 | 5/2021 | Hinterberger et al. |
| 2022/0169125 | A1 | 6/2022 | Borghi et al. |
| 2022/0169126 | A1 | 6/2022 | Borghi et al. |
| 2022/0169127 | A1 | 6/2022 | Ashraf et al. |
| 2022/0289046 | A1 | 9/2022 | Borghi et al. |
| 2022/0355679 | A1 | 11/2022 | Ashraf et al. |
| 2022/0407307 | A1 | 12/2022 | Putnam et al. |

FOREIGN PATENT DOCUMENTS

| | | |
|---|---|---|
| CN | 112327162 A | 2/2021 |
| DE | 102017007490 | 2/2019 |
| EP | 4031389 A1 | 11/2022 |
| FR | 2985690 | 7/2013 |
| JP | 2016081725 | 5/2016 |
| WO | 2022115126 A1 | 6/2022 |
| WO | 2022115134 A1 | 6/2022 |

OTHER PUBLICATIONS

Notice of Allowance dated Aug. 4, 2021 in U.S. Appl. No. 17/321,724.
International Search Report and Written Opinion dated Jan. 20, 2022 in PCT/US2021/046172.
Non-Final Office Action dated Dec. 21, 2021 in U.S. Appl. No. 17/403,179.
Notice of Allowance dated Feb. 23, 2022 in U.S. Appl. No. 17/403,179.
Supplementary European Search Report dated Oct. 10, 2022 in Application No. 2189378.8.
Canada Intellectual Property Office, Office Action dated May 9, 2023 in CA Serial No. 3152697.
USPTO, Notice of Allowance, dated May 11, 2023 in U.S. Appl. No. 17/536,687.
USPTO Non-Final Office Action, dated Oct. 18, 2022 in U.S. Appl. No. 17/466,326.
USPTO, Restriction Requirement, dated Feb. 23, 2023 in U.S. Appl. No. 17/804,524.
USPTO, Non Final Office Action dated Apr. 18, 2023, in U.S. Appl. No. 17/804,524.
USPTO, Non Final Office Action dated Mar. 27, 2023 in U.S. Appl. No. 17/536,687.
International Searching Authority, International Search Report and Written Opinion dated Mar. 29, 2023 in International Application PCT/US2022/50138.

* cited by examiner

BATTERY PACK ASSEMBLY

CROSS-REFERENCE TO RELATED APPLICATIONS

This application is a continuation-in-part of U.S. Ser. No. 17/466,326 filed on Sep. 3, 2021 and entitled "ELECTRIC VEHICLE BATTERY FRAME ASSEMBLY." U.S. Ser. No. 17/466,326 is a continuation of U.S. Ser. No. 17/321,724 filed on May 17, 2021, now U.S. Pat. No. 11,124,076 entitled "ELECTRIC VEHICLE BATTERY FRAME ASSEMBLY." U.S. Ser. No. 17/321,724 claims priority to, and the benefit of, U.S. Provisional Application No. 63/119,070 filed on Nov. 30, 2020 and entitled "ELECTRIC VEHICLE BATTERY FRAME ASSEMBLY."

This application is also a continuation-in-part of U.S. Ser. No. 17/403,179 filed on Aug. 16, 2021 and entitled "HIGH VOLTAGE ELECTRICAL SYSTEM FOR BATTERY ELECTRIC VEHICLE." U.S. Ser. No. 17/403,179 claims priority to, and the benefit of, U.S. Provisional Application No. 63/119,401 filed on Nov. 30, 2020 and entitled "HIGH VOLTAGE ELECTRICAL SYSTEM FOR BATTERY ELECTRIC VEHICLE."

The disclosures of all of the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to battery pack assemblies, and more particularly, to battery pack assemblies for electric vehicles.

BACKGROUND

Modern battery electric vehicles (BEVs) include a battery system capable of storing energy to be used to power the electric vehicle. For example, electrical energy provided by the battery system may be used to power one or more electric motors to drive the vehicle's wheels as well as power other electrically operated systems of the vehicle. In heavy-duty electric commercial vehicles, battery requirements (volume, mass, capacity, power output, etc.) may be substantial due to the size and weight of the vehicle and weight of the trailer and cargo to be delivered. While heavy-duty vehicle platforms typically comprise more volume to accommodate large battery systems compared to passenger vehicle platforms, the need to efficiently package and arrange these battery systems remains due to regulations governing vehicle size and weight and the need to package high voltage auxiliary components such as high voltage cables. Moreover, safety remains an important consideration given the high operating voltages of typical commercial vehicle battery systems. Accordingly, compact and safe battery pack assemblies for heavy-duty electric vehicles remain desirable.

SUMMARY

In an exemplary embodiments, a battery pack assembly comprises: a battery enclosure comprising a first side panel, a second side panel, a third side panel, a fourth side panel, a junction box panel, a top panel, and a bottom panel defining a module containing volume, a vertically oriented, internal dividing panel coupled to the top panel and the bottom panel and located in the module containing volume, a horizontally oriented, internal dividing panel coupled to the vertically oriented, internal dividing panel and the first side panel and located in the module containing volume, a junction box coupled to the junction box panel and comprising a first high voltage connector, a second high voltage connector, a third high voltage connector, a fourth high voltage connector, and a communications connector, and a first battery module positioned above the bottom panel, a second battery module positioned above the first battery module, a third battery module positioned above the second battery module, a fourth battery module positioned above the third battery module, a fifth battery module positioned above the fourth battery module, a sixth battery module positioned above the fifth battery module, a seventh battery module positioned above the sixth battery module, and an eighth battery module adjacent to the third battery module, the fourth battery module, the fifth battery module, the sixth battery module, and the seventh battery module, wherein the first battery module through the seventh battery module are positioned in a first orientation and stacked to form a column of battery modules, and wherein the eighth battery module is positioned in a second orientation at an angle of substantially 90 degrees relative to the column of battery modules and positioned between the vertically oriented, internal dividing panel and the first side panel and positioned between the horizontally oriented, internal dividing panel and the top panel.

The angle may be relative to an axis extending through the battery pack assembly that is parallel to the first side panel, the second side panel, the top panel, and the bottom panel and orthogonal to the third side panel and the fourth side panel. The junction box may be located beneath the eighth battery module. The battery pack assembly may further comprise a battery pack thermal system configured to provide a coolant to the first battery module, the second battery module, the third battery module, the fourth battery module, the fifth battery module, the sixth battery module, the seventh battery module, and the eighth battery module. The first side panel and the second side panel may each comprise at least one mounting bracket configured to be coupled to a battery frame assembly of an electric vehicle. The first battery module, the second battery module, the third battery module, the fourth battery module, the fifth battery module, the sixth battery module, the seventh battery module, and the eighth battery module may be electrically coupled in series. The battery pack assembly may be configured with a capacity of between 100 amp-hours (Ah) and 130 Ah and with a net energy of between 40 kilowatt-hours (kWh) and 120 kWh.

In another exemplary embodiment, a battery enclosure comprises: a first side panel, a second side panel spaced apart from and substantially parallel to the first side panel, a third side panel coupled to the first side panel and the second side panel, a fourth side panel spaced apart from the third side panel and coupled to the first side panel and the second side panel, a top panel substantially orthogonal to the first side panel, the second side panel, the third side panel, and the fourth side panel and coupled to the first side panel, the second side panel, the third side panel, and the fourth side panel, a bottom panel substantially orthogonal to the first side panel, the second side panel, the third side panel, and the fourth side panel and coupled to the first side panel, the second side panel, the third side panel, and the fourth side panel, and a junction box panel coupled to the bottom panel and the first side panel, wherein the junction box panel is oriented at a first angle relative to the bottom panel and a second angle relative to the first side panel.

The battery enclosure may further comprise a vertically oriented, internal dividing panel coupled to the top panel and the bottom panel. The battery enclosure may further comprise a horizontally oriented, internal dividing panel coupled to the vertically oriented, internal dividing panel and the first side panel. The third side panel may be substantially orthogonal to the fourth side panel. The first angle may be between 110 and 120 degrees and the second angle may be between 150 and 160 degrees. At least a portion of the junction box may be substantially aligned with the first panel when viewed from a direction normal to the fourth side panel.

In another exemplary embodiment, a battery pack assembly comprises: a battery enclosure comprising a plurality of panels and defining a module containing volume, a plurality of battery modules in the module containing volume, a junction box coupled to the plurality of panels and comprising a first high voltage connector, a second high voltage connector, a third high voltage connector, a fourth high voltage connector, a manual service disconnect (MSD), and a pyro fuse, and a laminated busbar assembly, comprising: a first conductive layer electrically coupled to the first high voltage connector and the second high voltage connector, a second conductive layer electrically coupled to the third high voltage connector and the fourth high voltage connector, a third conductive layer electrically coupled to the pyro fuse, and a fourth conductive layer electrically coupled to the MSD, wherein the first conductive layer is configured to receive current from the plurality of battery modules and deliver current to at least one of the first high voltage connector and the second high voltage connector, wherein the second conductive layer is configured to receive current from at least one of the third high voltage connector and the fourth high voltage connector and deliver current to the plurality of battery modules, and wherein the fourth conductive layer is configured to receive current from the plurality of battery modules and deliver current to the third conductive layer through the pyro fuse and the MSD.

The battery pack assembly may further comprise a first contactor electrically coupled to the third high voltage connector and the fourth high voltage connector. The battery pack assembly may further comprise a second contactor electrically coupled to the first high voltage connector and the second high voltage connector. The second contactor may be electrically coupled to a current sensor that is electrically coupled to the first conductive layer of the laminated busbar assembly. The first conductive layer may comprise a horizontal leg and a vertical leg, the second conductive layer comprises a horizontal leg and a vertical leg, the third conductive layer comprises a horizontal leg and a vertical leg, and the fourth conductive layer comprises a horizontal leg and a vertical leg. The junction box may further comprise a pre-charge circuit configured to limit inrush current into the battery pack assembly. The pyro fuse and the MSD may be electrically coupled via a busbar.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
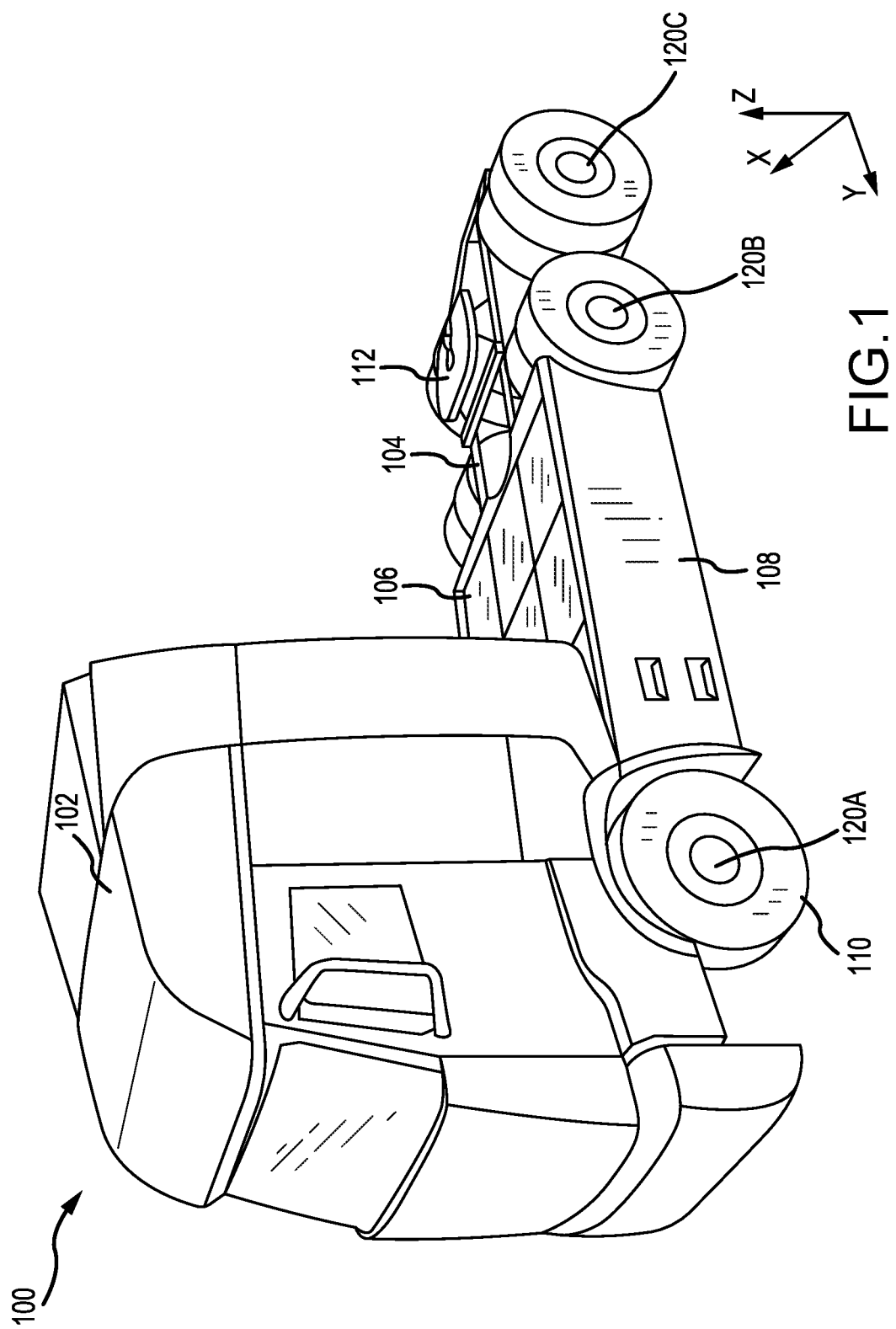
FIG. 1 illustrates a perspective view of an electric vehicle comprising at least one battery pack assembly, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, or mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with battery electric vehicles (including hybrid battery electric vehicles), fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery. As such, numerous applications of the present disclosure may be realized.

As used herein, the term "high voltage" is defined as an electric potential difference (or components rated to operate at an electric potential difference) of at least 100 volts (V). However, it should be appreciated that the electrical systems and components disclosed herein may be configured to operate at voltages greater than 100 V, for example, voltages greater than 200 V, greater than 300 V, greater than 400 V, greater than 500 V, greater than 600 V, greater than 700 V, greater than 800 V, greater than 900 V, or greater than 1000 V. As used herein, the terms "vertical," "above," "below," "upper," "lower," and "height" are in relation to the Z-direction as illustrated. The terms "horizontal," "width," and "length" are in relation to the X-direction or Y-direction as illustrated depending on context. The term "substantially" with respect to a measurement indicates that the measurement is +/−10% of the reference measurement.

Medium- and heavy-duty commercial vehicles are large contributors to greenhouse gas emissions both domestically and internationally. For example, while constituting only about five percent of on-road vehicles in the United States in 2018, the United States Environmental Protection Agency estimates that such vehicles accounted for approximately 25% of total emissions in the transportation sector. As a result, there has been a recent push to reduce greenhouse gas emissions from medium- and heavy-duty commercial vehicles, in part through the electrification of these vehicles. As a result, traditional problems related to the packaging of internal combustion engines have been replaced with problems related to the packaging and protection of battery assemblies and related electronics. These problems are exaggerated in medium- and heavy-duty commercial electric vehicles, in part due to the increased power needs of these vehicles. Accordingly, new battery pack assemblies for vehicles, and in particular, commercial vehicles, remain desirable.

Accordingly, with reference to FIG. 1, an electric vehicle 100 is illustrated from a top perspective view, in accordance with various embodiments. As illustrated in FIG. 1, electric vehicle 100 is a heavy-duty BEV. Electric vehicle 100 is a tractor unit which may tow a trailer unit configured to hold and transport cargo. Electric vehicle 100 comprises a class 8, class 7, class 6, or any other weight classification of tractor-trailer combination. As described herein, electric vehicle 100 extends in a longitudinal direction along the Y-axis from a rear of electric vehicle 100 to a front of electric vehicle 100. Electric vehicle 100 extends in a transverse direction along the X-axis from a driver side of electric vehicle 100 to a passenger side of electric vehicle 100. Finally, electric vehicle 100 extends in a vertical direction along the Z-axis from a ground surface on which electric vehicle 100 drives to a top of electric vehicle 100.

Electric vehicle 100 comprises a cab 102 supported by a chassis 104. Cab 102 may be configured to shelter one or more vehicle operators or passengers from the external environment. In various embodiments, cab 102 comprises a door configured to allow ingress and egress into and from cab 102, one or more seats, a windshield, and numerous accessories configured to improve comfort for the operator and passenger(s). As illustrated in FIG. 1, electric vehicle 100 comprises a cab-over or cab forward style tractor unit but is not limited in this regard and may comprise any style of tractor unit including a conventional or American cab style tractor unit.

Chassis 104, otherwise known as the vehicle frame, is configured to support various components and systems of electric vehicle 100, including cab 102. Chassis 104 comprises a ladder-like structure with various mounting points for suspension, powertrain, batteries, and other systems of electric vehicle 100. Chassis 104 supports and is coupled to a battery frame assembly 106 which is configured to house one or more battery pack assemblies 200, each of which provide power to and operate high voltage components and systems of electric vehicle 100. Battery frame assembly 106 may be covered by one or more side covers 108 configured to provide corrosion-resistance and to improve aerodynamics along the sides of battery frame assembly 106. Electric vehicle 100 further comprises wheels 110 having one or more tires coupled to one or more axles 120 and configured to roll along a driving surface. In various embodiments, electric vehicle 100 comprises a pair of single wheels coupled to a front axle 120A, and a pair of dual wheels coupled to two rear axles (first rear axle 120B and second rear axle 120C). One or more axles may be driven. For example, in various embodiments, electric vehicle 100 comprises a 6×2 configuration with a single driven axle; however, electric vehicle 100 is not limited in this regard and may comprise a 4×2, 6×4, 6×6, or other suitable configuration. Battery frame assembly 106 may be positioned between front axle 120A and first rear axle 120B. One or more trailer units (not shown) may be coupled to electric vehicle 100, for example via a fifth-wheel coupling 112.

Figure 2:
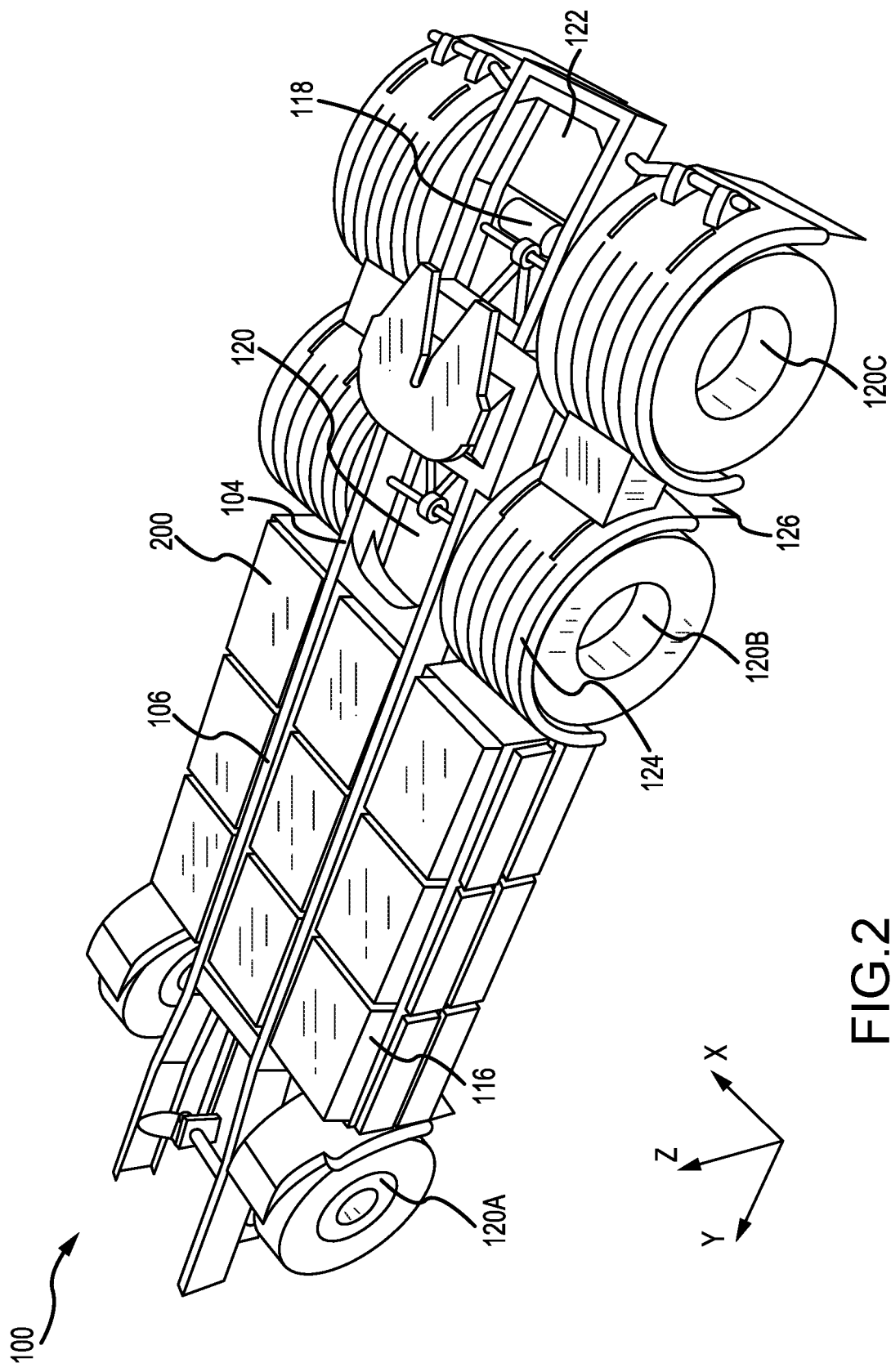
FIG. 2 illustrates a perspective view of an electric vehicle with a cab removed, in accordance with various embodiments.

With reference to FIG. 2, electric vehicle 100 is illustrated with cab 102 removed, in accordance with various embodiments. As previously discussed, electric vehicle 100 comprises chassis 104 and battery frame assembly 106 coupled to chassis 104. Battery frame assembly 106 may accommodate one or more battery pack assemblies 200. As will be described in further detail below, battery pack assemblies 200 contain one or more modules, each of which contains one or more battery cells. The battery cells, battery modules, and battery packs may be electrically coupled to each other in series and/or parallel to increase voltage and/or current depending on electric vehicle 100 operation requirements. Battery pack assemblies 200 may be modular in nature, meaning the battery packs may function individually or in combination to achieve desired energy output. Moreover, one or more battery pack assemblies 200 may be removed from electric vehicle 100 to limit weight occupied by battery pack assemblies 200 depending on operational and payload needs without affecting the remaining battery pack assemblies 200. Finally, each battery pack assembly 200 may comprise a similar size and shape as every other battery pack assembly 200 in order to permit customization of the location of the battery pack assemblies 200 in battery frame assembly 106. Stated otherwise, any battery pack assembly 200 may be positioned in any location in battery frame assembly 106 in order to permit efficient swapping of battery pack assemblies 200 or customization of the number and orientation of multiple battery pack assemblies 200 in battery frame assembly 106.

Battery pack assemblies 200 are configured to power one or more electric motors to drive electric vehicle 100. For example, one or more of front axle 120A, first rear axle 120B, or second rear axle 120C of electric vehicle 100 may comprise an electric axle, or e-axle, which may include one or more electric motors, one or more gearboxes, and a differential configured to drive wheels of electric vehicle 100. In various embodiments, direct current from battery pack assemblies 200 may be converted to alternating current in one or more inverters 122 and directed to one or more electric motors in each e-axle. However, in various embodiments, an electric motor may comprise an alternating current or direct current motor coupled to each individual wheel. Each e-axle may comprise a solid axle configuration or a split axle configuration. Numerous embodiments are contemplated in this regard.

Electric vehicle 100 may further comprise one or more suspension systems 118 (for example, leaf spring, equalizer beam, torsion bar, or air spring suspension systems), one or more fenders 124, and one or more mud guards 126, among other components which will not be described in detail herein for sake of brevity.

Figure 3:
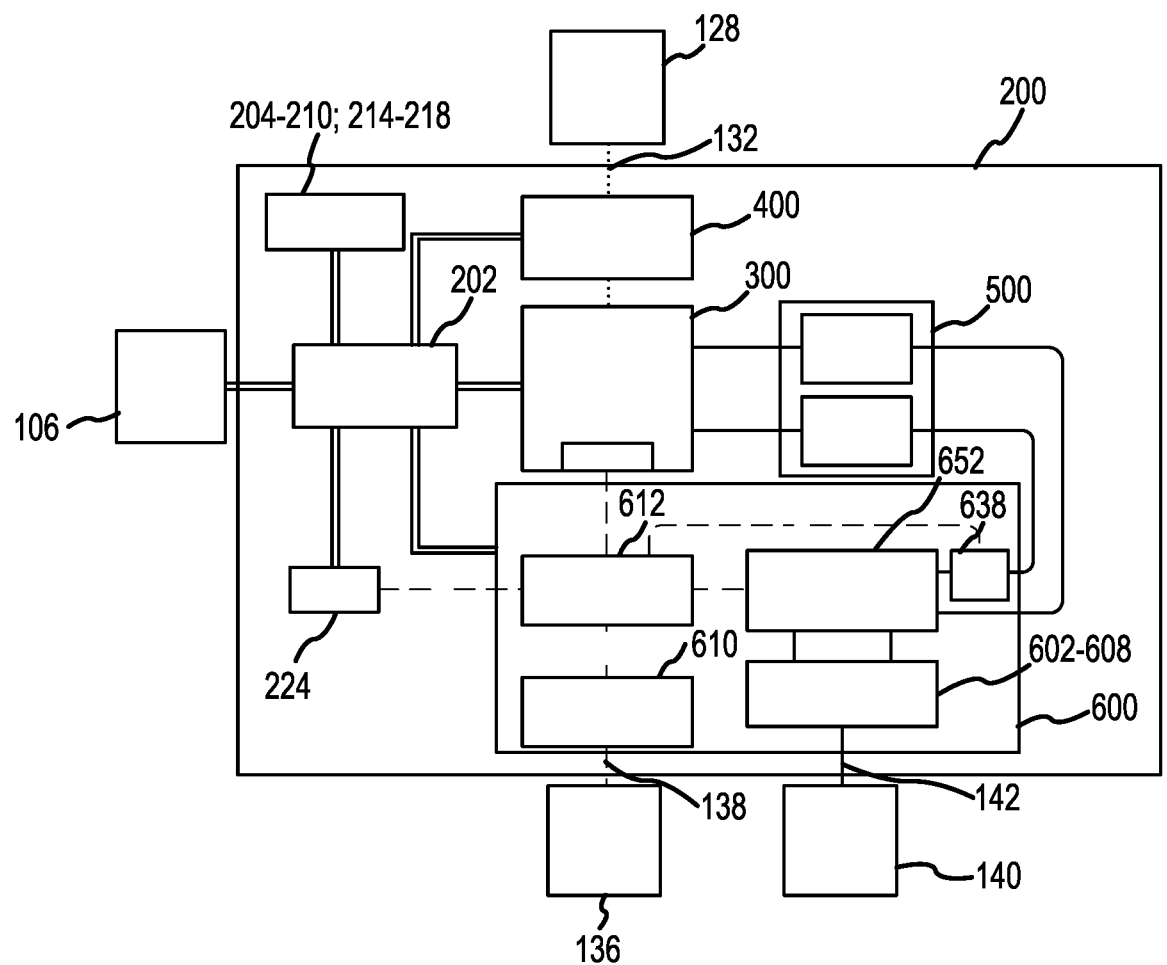
FIG. 3 illustrates a boundary diagram of a battery pack assembly of an electric vehicle, in accordance with various embodiments.

With reference now to FIG. 3, a boundary diagram of battery pack assembly 200 is illustrated, in accordance with various embodiments. Battery pack assembly 200 may be mechanically, thermally, and/or electrically coupled to various other systems of electric vehicle 100. For example, in various embodiments, battery pack assembly 200 is configured to be thermally coupled to a vehicle thermal system 128. Vehicle thermal system 128 may comprise a thermal system comprising one or more radiators, one or more heat exchangers, one or more fluid pumps, one or more vapor-compression refrigeration circuits, and coolant routing components and tubing configured to distribute and/or dissipate heat generated by components of electric vehicle 100 to increase thermal and electrical efficiency of the vehicle. In various embodiments, depending on ambient temperatures and operating conditions, vehicle thermal system 128 is configured to transfer heat to battery pack assembly 200 to precondition battery pack assembly 200 in cold ambient conditions, and may also be configured to cool battery pack assembly 200 in times of warm ambient conditions or times of high-power output. Vehicle thermal system 128 may be thermally coupled to a battery pack thermal system 400 situated within battery pack assembly 200 via one or more coolant lines 132.

As discussed above, battery pack assembly 200 may be mechanically and removably coupled to battery frame assembly 106. For example, as will be discussed further in relation to FIGS. 4A-4G, battery pack assembly 200 comprises multiple mounts on a battery pack enclosure configured to mount battery pack assembly 200 to battery frame assembly 106. Each battery pack assembly 200 may be configured to be mounted in and/or removed from any battery pack receptacle of battery frame assembly 106. In various embodiments, battery pack assembly 200 may be coupled to battery frame assembly 106 using one or more mechanical fasteners 134. Mechanical fasteners 134 may comprise screws, nuts and bolts, latches, clips, rivets, adhesives, or the like, for example. In such a way, battery pack assembly 200 can be coupled to or decoupled from battery frame assembly 106 in a timely manner and without the need for complex tooling or attachment methods while also ensuring minimal movement of battery pack assembly 200 as electric vehicle 100 is operated.

In various embodiments, battery pack assembly 200 is in electrical communication with a vehicle controller area network (CAN) bus 136. In various embodiments, vehicle CAN bus 136 is electrically coupled to one or more microcontrollers located within battery pack assembly 200 to permit various control systems of electric vehicle 100 to communicate with, monitor, record data, instruct, and otherwise manage various functions associated with battery pack assembly 200. In various embodiments, vehicle CAN bus 136 is in electrical communication with one or more electrical components or systems comprising printed circuit boards (PCBs) (for example, a pre-charge circuit and/or a miniature circuit breaker) located within a junction box 600 mounted to battery pack assembly 200 and also in electrical communication with one or more electronic control units located in electric vehicle 100. For example, in various embodiments, vehicle CAN bus 136 may also be in electrical communication with a front or rear power distribution unit, vehicle electronic control unit, battery management system, crash sensor electronic control unit, and/or other vehicle control systems responsible for managing or interfacing with battery pack assembly 200. In various embodiments, vehicle CAN bus 136 is electrically coupled to battery pack assembly 200 using one or more wired connections and communication connectors 138, but is not limited in this regard and may be configured to communicate with battery pack assembly 200 wirelessly.

With continued reference to FIG. 3, in various embodiments, battery pack assembly 200 is in electrical communication with a vehicle high voltage bus 140. Vehicle high voltage bus 140 may be configured to distribute high voltage electricity from battery pack assembly 200 (or multiple battery pack assemblies 200) to high voltage systems of electric vehicle 100, including front and rear power distribution units (PDUs), inverters, electric motors, and other high voltage systems. In various embodiments, vehicle high voltage bus 140 is in electrical communication with battery pack assembly 200 (and other vehicle high voltage systems) through high voltage cables and connectors 142.

With continued reference to FIG. 3 and with additional reference to FIGS. 4A-4G, battery pack assembly 200 is illustrated separated from electric vehicle 100. Broadly speaking, battery pack assembly 200 comprises a rigid structure capable of storing one or more battery cells, battery modules, battery pack thermal systems, one or more flood sensors 224, an electrical contact assembly, pack electronics, and wiring. As previously discussed, battery pack assembly 200 may be configured to be mounted to battery frame assembly 106 of electric vehicle 100 in order to provide high voltage electricity to the high voltage systems of electric vehicle 100, including inverters and/or electric motors, in order to operate electric vehicle 100. Battery pack assembly 200 is configured to be coupled to battery frame assembly 106 outboard of chassis 104 on a driver's side of electric vehicle 100 or outboard of chassis 104 on a passenger's side of electric vehicle 100. However, it should be appreciated battery pack assembly 200 could also be configured to be coupled to battery frame assembly 106 between side members of chassis 104. Further, battery pack assembly 200 is configured to be coupled to battery frame assembly 106 at any point along a longitudinal length of battery frame assembly 106, including any row of battery pack receptacles as illustrated in FIG. 2.

Battery pack assembly 200 comprises a battery enclosure 202. In various embodiments, battery enclosure 202 is configured to: isolate and protect the contents of battery pack assembly 200 from the external environment; protect persons near battery pack assembly 200 from unintended electrical discharges; provide a support structure for one or more battery modules, battery pack thermal systems, electrical contact assemblies, and electronics; provide a mounting interface with battery frame assembly 106; compliment desired mechanics of chassis 104; and mitigate the risk of fire propagation between any given battery pack assembly 200 and other components and systems of electric vehicle 100.

In various embodiments, battery enclosure 202 comprises a first side panel 204, a second side panel 206 opposite first side panel 204, a third side panel 208, and a fourth side panel 210 opposite third side panel 208. Each of first side panel 204, second side panel 206, third side panel 208, and fourth side panel 210 comprise an exterior surface configured to face the exterior environment and an interior surface configured to partially define a module containing volume 212. First side panel 204 may be substantially parallel to second side panel 206 and third side panel 208 may be substantially parallel to fourth side panel 210. First side panel 204 and second side panel 206 may be substantially orthogonal to both third side panel 208 and fourth side panel 210. First side panel 204 may be spaced apart from second side panel 206 by a first distance D1. Third side panel 208 may be spaced apart from fourth side panel 210 by a second distance D2. As illustrated, first distance D1 is less than second distance D2; however, battery enclosure 202 is not limited in this regard and first distance D1 may be equal to second distance D2 or greater than second distance D2 in various embodiments.

In various embodiments, the structure of first side panel 204 may be the same or different from the structure of second side panel 206. As illustrated, first side panel 204 comprises a vertical height V1 and second side panel comprises a vertical height V2. Vertical height V1 of first side panel 204 is less than vertical height V2 of second side panel 206; however, battery enclosure 202 is not limited in this regard and vertical height V1 may be equal to vertical height V2 or greater than vertical height V2 in various embodiments. First side panel 204 and second side panel 206 may comprise a common width (X-direction as illustrated), which may also correspond to an overall length of battery pack assembly 200. As illustrated, when assembled to battery frame assembly 106, first side panel 204 is the inboard-facing surface of battery pack assembly 200, and second side panel 206 is the outboard-facing surface of battery pack assembly 200. However, it should be appreciated that, depending on the location of high voltage connections and structure of battery frame assembly 106, first side panel 204 and second side panel 206 may be configured to be oriented in any direction, and either panel may be inboard-facing, outboard-facing, forward-facing, or rear-facing.

In various embodiments, the structure of third side panel 208 may be the same or different from the structure of fourth side panel 210. As illustrated, third side panel 208 is a mirror image of fourth side panel 210. More specifically, third side panel 208 and fourth side panel 210 are mirrored about a vertical plane which is parallel to third side panel 208 and fourth side panel 210 and which bisects first side panel 204 and second side panel 206. As such, in various embodiments, third side panel 208 and fourth side panel 210 comprise substantially similar vertical and horizontal dimensions. As illustrated, when assembled to battery frame assembly 106, third side panel 208 is the forward-facing surface of battery pack assembly 200, and fourth side panel 210 is the rear-facing surface of battery pack assembly 200. However, it should be appreciated that depending on the location of high voltage connections and structure of battery frame assembly 106, third side panel 208 and fourth side panel 210 may be configured to be oriented in any direction and either panel may be inboard-facing, outboard-facing, forward-facing, or rear-facing.

Battery enclosure 202 further comprises a top panel 214 and a bottom panel 216 spaced apart and opposite top panel 214. Each of top panel 214 and bottom panel 216 comprise an exterior surface configured to face the external environment and an interior surface configured to partially define module containing volume 212. Bottom panel 216 may be configured to support a least a portion of the weight of modules in battery pack assembly 200 either directly or indirectly through first side panel 204, second side panel 206, third side panel 208 and/or fourth side panel 210. Top panel 214 comprises a plurality of apertures 254 configured to receive an equal number of fasteners to mechanically couple a catwalk plate (not shown) to top panel 214. In various embodiments, top panel 214 comprises nine apertures 254 configured to receive nine fasteners; however, top panel 214 is not limited in this regard and may comprise more or fewer apertures 254. While discussed herein as comprising a plurality of apertures in top panel 214, battery enclosure 202 is not limited in this regard and may comprise one or more apertures in any of the panels configured to receive fasteners to mechanically couple catwalk plates to battery enclosure 202.

Top panel 214 may be substantially parallel to bottom panel 216. Both top panel 214 and bottom panel 216 may be substantially orthogonal to each of first side panel 204, second side panel 206, third side panel 208, and fourth side panel 210. Top panel 214 may be spaced apart from bottom panel 216 by a vertical distance (Z-direction as illustrated) substantially equal to vertical height V2 of second side panel 206. Top panel 214 comprises a width (X-direction as illustrated) equal to first distance D1 and a length (Y-direction as illustrated) equal to second distance D2. Bottom panel 216 comprises a length (Y-direction as illustrated) equal to second distance D2; however, in various embodiments, bottom panel 216 may comprise a width (X-direction as illustrated) less than first distance D1. As such, in various embodiments, bottom panel 216 may comprise a length substantially similar of the length of top panel 214 but comprise a width less than a width of top panel 214. However, it should be appreciated that battery pack assembly 200 is not limited in this regard and bottom panel 216 may comprise length and width dimensions equal to or greater than the length and width dimensions of top panel 214.

Battery enclosure 202 further comprises a junction box panel 218. Similar to first side panel 204, second side panel 206, third side panel 208, fourth side panel 210, top panel 214, and bottom panel 216, junction box panel 218 comprises an exterior surface configured to face the external environment and an internal surface configured to partially define module containing volume 212 and partially define a volume of junction box 600. When assembled to battery pack assembly 200, junction box panel 218 may be situated at a first angle α relative to bottom panel 216 and a second angle β relative to first side panel 204. For example, with attention to FIG. 4D, first angle α may be defined as the angle between an outer surface of bottom panel 216 and an outer surface of junction box panel 218. Second angle β may be defined as the angle between an outer surface of first side panel 204 and the outer surface of junction box panel 218. In various embodiments, first angle α may be between 100 and 130 degrees, or between 110 and 120 degrees. Second angle β may be between 140 and 170 degrees, or between 150 and 160 degrees. Stated otherwise, junction box panel 218 is configured to be coupled to outboard edge 220 of bottom panel 216 and extend vertically (positive Z-direction as illustrated) and horizontally (positive Y-direction as illustrated) outward to be coupled to a lower flange on first side panel 204. As such, an outer edge 222 of junction box 600 (including high voltage connections and communications connections) coupled to junction box panel 218 may be substantially aligned with first side panel 204 when viewed in a direction normal fourth side panel 210 (i.e., FIG. 4D). In such a way, junction box 600 may be coupled to battery pack assembly 200 without occupying a large volume (outside of a volume associated with battery pack assembly 200), which permits battery pack assembly 200 (and accompanying high voltage cables and communication cables) to be coupled to battery frame assembly 106 in a similar compact manner. In various embodiments, junction box 600 may be positioned vertically below at least one battery module (for example, an eighth battery module 300-8) positioned in battery enclosure 202. While described herein as comprising a separate junction box panel 218, battery enclosure 202 is not limited in this regard and junction box panel 218 may be integral with first side panel 204 (which may be coupled to and form a right angle with bottom panel 216) and/or bottom panel 216.

Figure 4A:
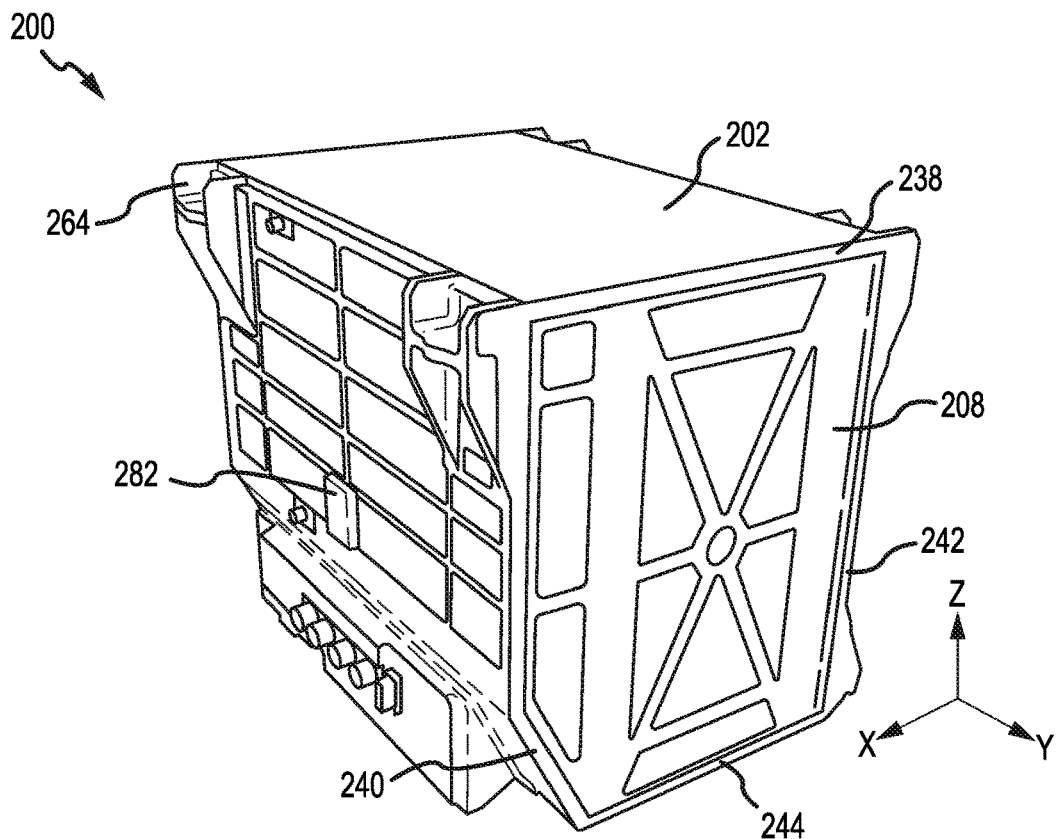
FIG. 4A illustrates a perspective view of a battery pack assembly of an electric vehicle, in accordance with various embodiments.
Figure 4B:
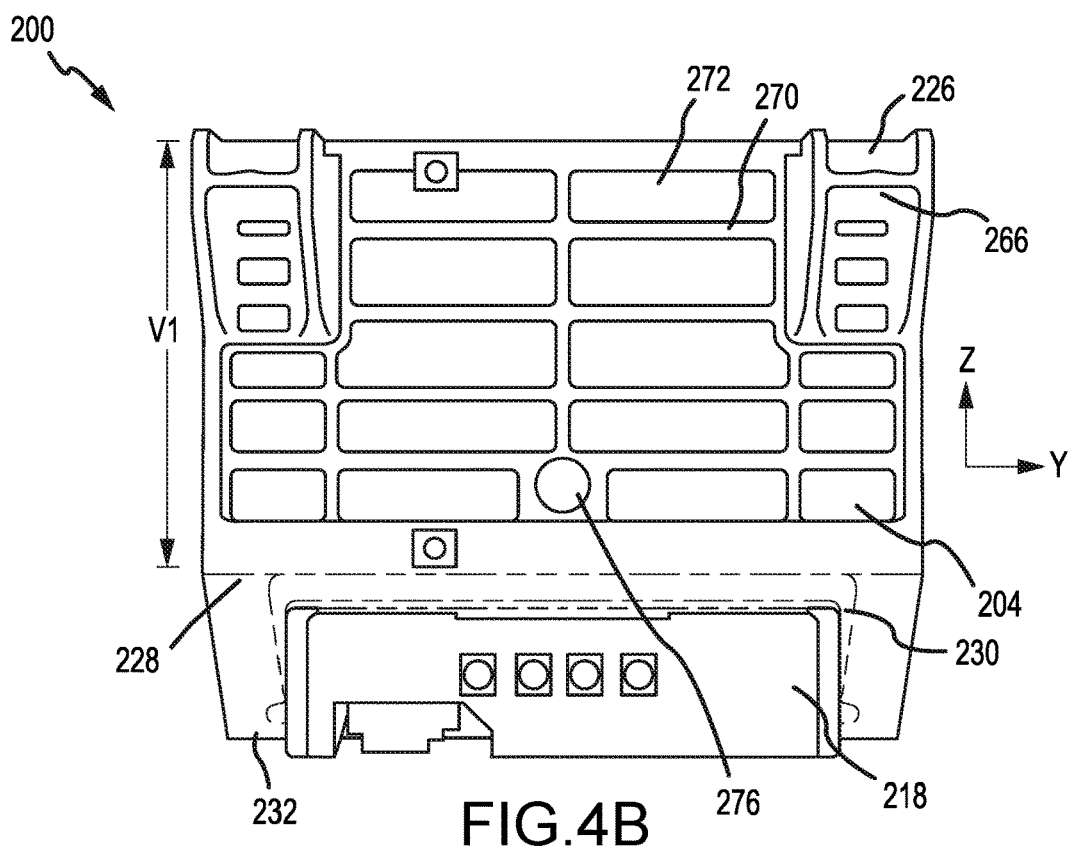
FIG. 4B illustrates a first side view of a battery pack assembly of an electric vehicle, in accordance with various embodiments.
Figure 4C:
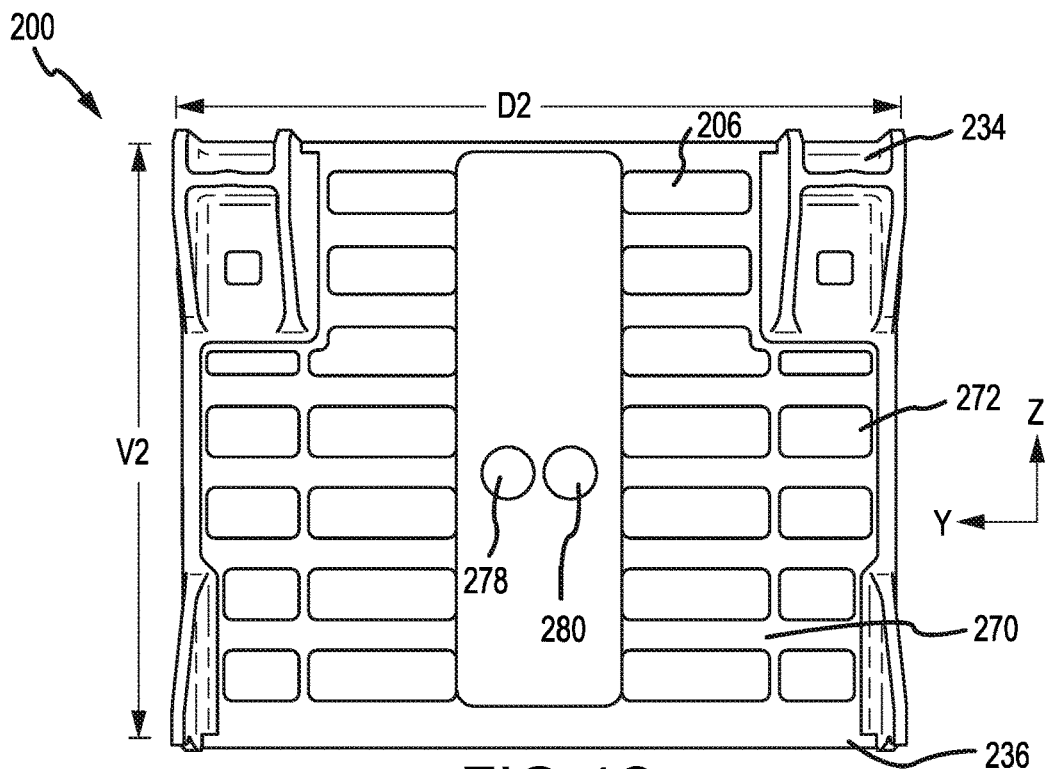
FIG. 4C illustrates a second side view of a battery pack assembly of an electric vehicle, in accordance with various embodiments.
Figure 4D:
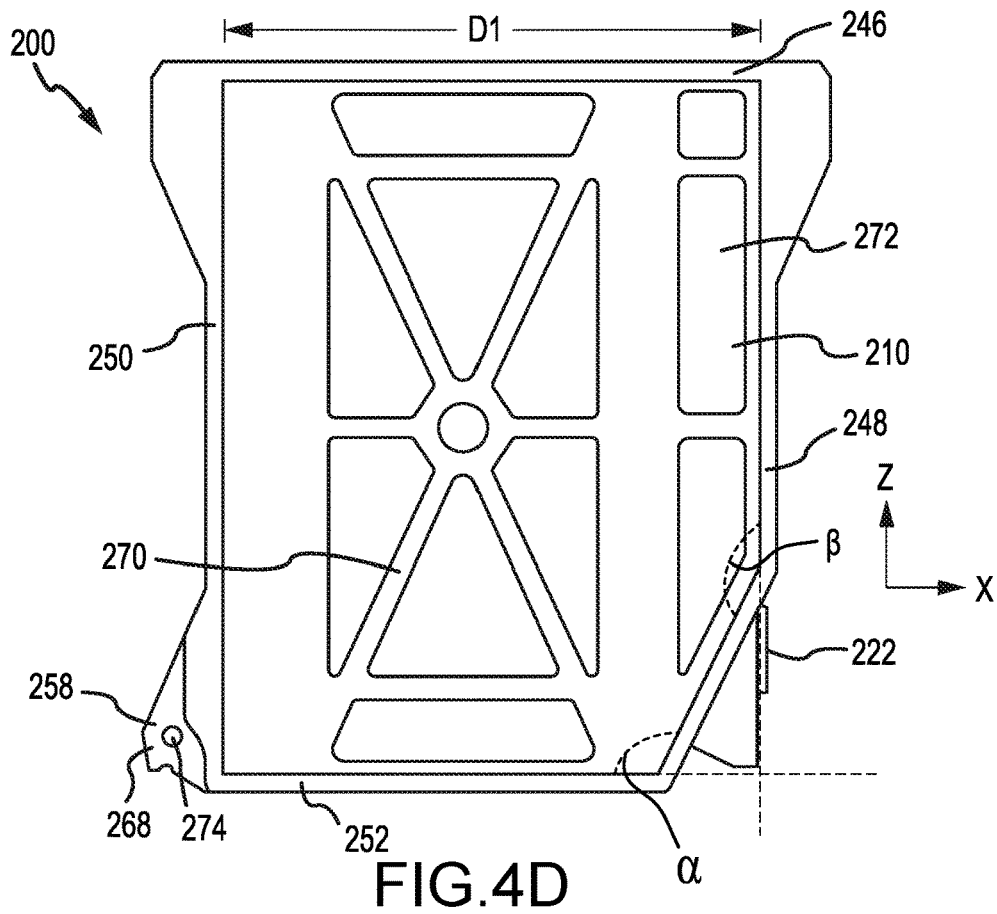
FIG. 4D illustrates a third side view of a battery pack assembly of an electric vehicle, in accordance with various embodiments.
Figure 4E:
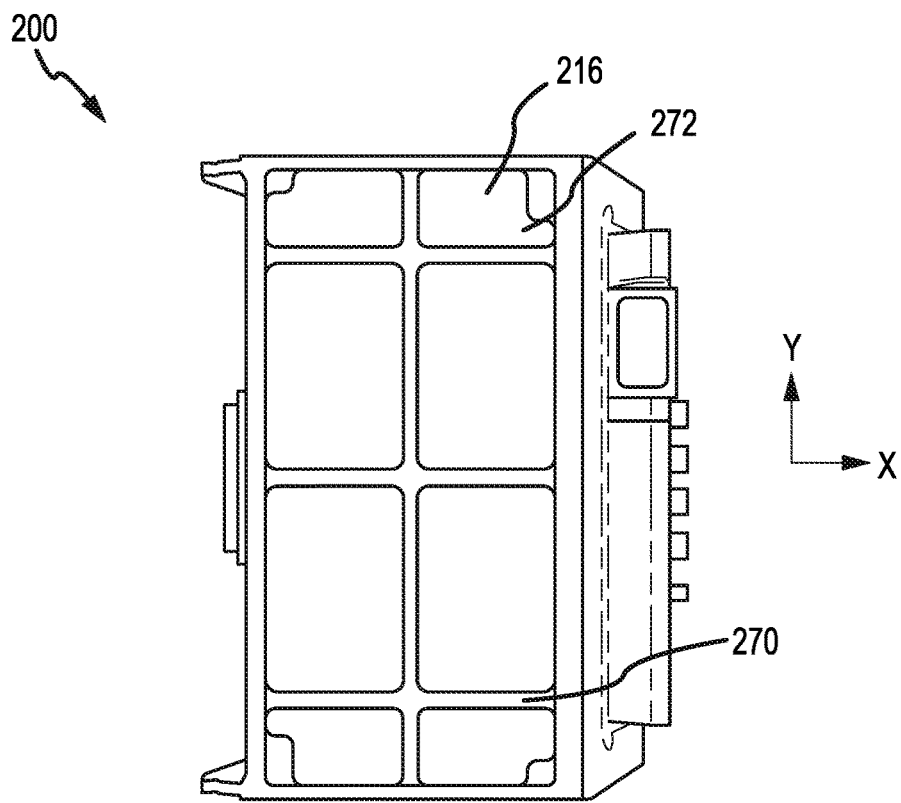
FIG. 4E illustrates a bottom view of a battery pack assembly of an electric vehicle, in accordance with various embodiments.
Figure 4F:
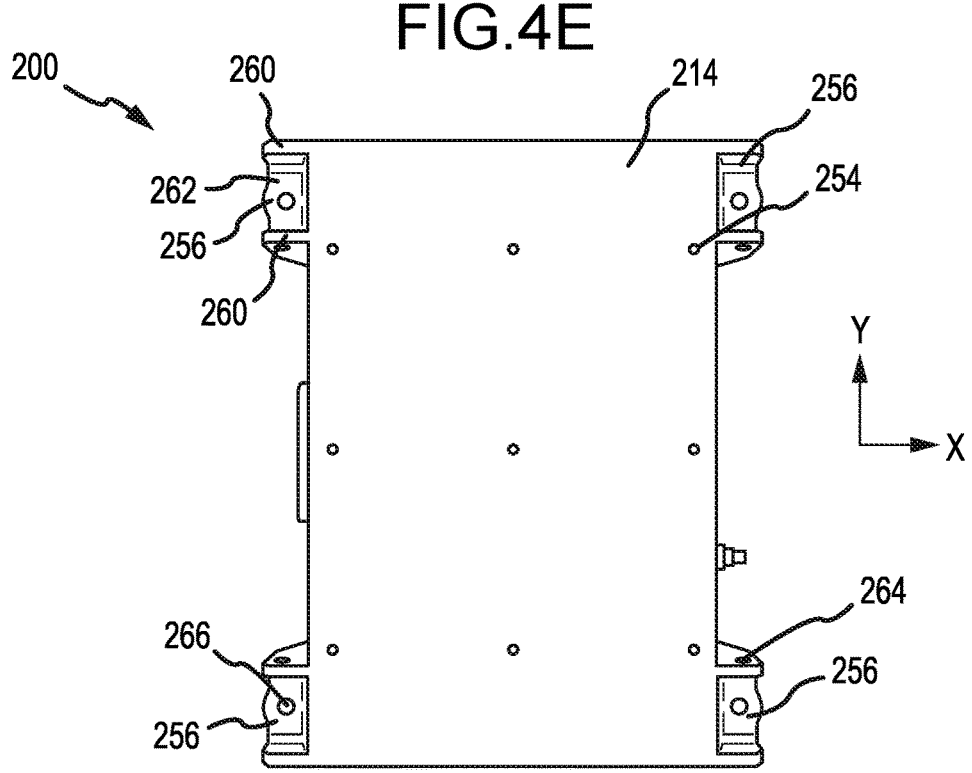
FIG. 4F illustrates a top view of a battery pack assembly of an electric vehicle, in accordance with various embodiments.
Figure 4G:
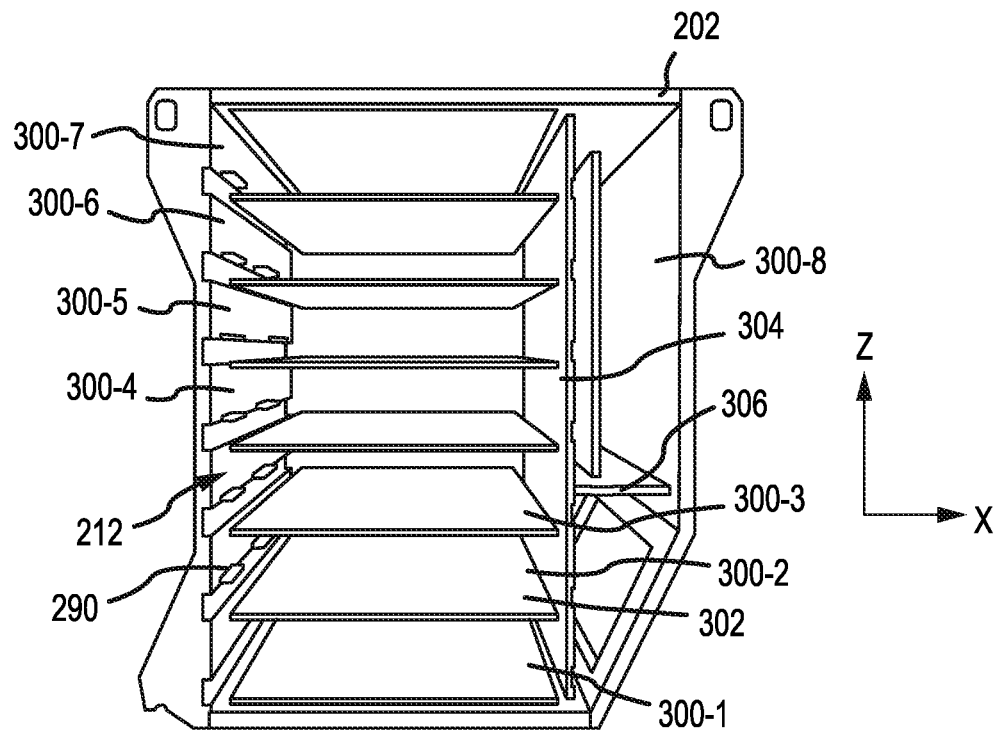
FIG. 4G illustrates a side view of a battery pack assembly with multiple side panels removed, in accordance with various embodiments.

With continued reference to FIGS. 3-4G, one or more of first side panel 204, second side panel 206, third side panel 208, fourth side panel 210, top panel 214, bottom panel 216, or junction box panel 218 may comprise substantially planar surfaces that may be made of any suitable material. For example, in various embodiments, each of the panels may comprise a metallic material such as aluminum, aluminum alloy, magnesium, magnesium alloy, titanium, titanium alloy, or steel alloy. In various embodiments, each panel may comprise a 6061-T6 aluminum. However, in various embodiments, the panels comprise a polymer, composite material, carbon-fiber material, or any other suitable material or combinations thereof having a relatively low weight and high strength.

Moreover, in various embodiments, the material selection for the various panels may be the same or may differ. For example, certain panels requiring greater strength or stiffness (for example, bottom panel 216) may comprise a first material, while other panels requiring differing material properties (for example, junction box panel 218) may comprise a second material different from the first material. In various embodiments, certain panels comprise a first material having a relatively low coefficient of thermal conductivity, while the other panels comprise a second material having a relatively high coefficient of thermal conductivity but lower density. For example, in various embodiments, certain panels (any number of first side panel 204, second side panel 206, third side panel 208, fourth side panel 210, top panel 214, bottom panel 216, or junction box panel 218) comprise a steel alloy material, while the remaining panels comprise an aluminum alloy. In such a way, battery enclosure 202 may be tailored to limit heat transfer in areas (or panels) deemed more likely to experience heat as a result of a battery fire, while not excessively affecting the weight of battery pack assembly 200 or electric vehicle 100. In various embodiments, battery pack assembly 200 may comprise a thermal barrier material (such as yttria-stabilized zirconia, polyurethane, aramid, ceramic, or polyamide material) sprayed on or coupled to the interior surface of one or more panels (any number of first side panel 204, second side panel 206, third side panel 208, fourth side panel 210, top panel 214, bottom panel 216, or junction box panel 218) or between one or more battery modules. In various embodiments, battery pack assembly 200 comprises a thermal barrier material between each battery module such that a thermal event in any given battery module does not propagate to (or is substantially delayed in propagating to) an adjacent battery module. In various embodiments, the thermal barrier material may be positioned between each battery module and the cold plate of each battery module. The thermal barrier material may be configured to contain fire within battery pack assembly 200 and prevent (or substantially delay) the fire from propagating to adjacent components or systems.

In various embodiments, the panels may be manufactured using any suitable process including additive manufacturing, casting, stamping, machining, forging, drawing, extruding, welding, or a combination thereof. One or more of first side panel 204, second side panel 206, third side panel 208, fourth side panel 210, top panel 214, bottom panel 216, or junction box panel 218 comprise one or more stiffening ribs 270 and one or more recesses 272. Depending on shape and orientation, stiffening ribs 270 may be configured to resist tensile, compressive, and/or torsion forces acting on battery enclosure 202, while recesses 272 may be configured to reduce the weight of battery enclosure 202.

As illustrated in FIGS. 4A-4G, each panel is mechanically coupled to at least one other panel to partially form battery enclosure 202. For example, first side panel 204 is coupled to top panel 214 via a plurality of fasteners along a top flange 226 of first side panel 204 and coupled to junction box panel 218 via a plurality of fasteners along a bottom flange 228 of first side panel 204. Junction box panel 218 is coupled to first side panel 204 via a plurality of fasteners along a top flange 230 of junction box panel 218 and coupled to bottom panel 216 via a plurality of fasteners along a bottom flange 232 of junction box panel 218. Second side panel 206 is coupled to top panel 214 via a plurality of fasteners along a top flange 234 of second side panel 206 and coupled to bottom panel 216 via a plurality of fasteners along a bottom flange 236 of second side panel 206. Third side panel 208 is coupled to top panel 214 via a plurality of fasteners along a top flange 238 of third side panel 208, coupled to first side panel 204 and junction box panel 218 via a plurality of fasteners along a first side flange 240 of third side panel 208, coupled to second side panel 206 via a plurality of fasteners along a second side flange 242 of third side panel 208, and coupled to bottom panel 216 via a plurality of fasteners along a bottom flange 244 of third side panel 208. Finally, fourth side panel 210 is coupled to top panel 214 via a plurality of fasteners along a top flange 246 of fourth side panel 210, coupled to first side panel 204 and junction box panel 218 via a plurality of fasteners along a first side flange 248 of fourth side panel 210, coupled to second side panel 206 via a plurality of fasteners along a second side flange 250 of fourth side panel 210, and coupled to bottom panel 216 via a plurality of fasteners along a bottom flange 252 of fourth side panel 210.

While discussed herein as comprising a plurality of fasteners, battery enclosure 202 is not limited in this regard and the various panels may be coupled together via any suitable method. For example, in various embodiments, the various panels of battery enclosure 202 may be welded, friction stir-welded, brazed, press-fit, snap fit, soldered, chemically welded, adhered using adhesives, or other suitable coupling method. Such alternative coupling methods may, in some cases, reduce or eliminate the need for internal ground wires between the various panels of battery enclosure 202. Alternatively, two or more panels may be formed integrally to eliminate the need to couple the panels after formation which may reduce part count and assembly/service time. Further, a combination of multiple coupling methods may be utilized to secure various components of battery enclosure 202.

In various embodiments, battery enclosure 202 further comprises one or more upper mounting brackets 256. Battery enclosure 202 can comprise two upper mounting brackets 256 located on the upper corners of first side panel 204 and two upper mounting brackets 256 located on the upper corners of second side panel 206; however, it should be appreciated that battery enclosure 202 is not limited in this regard and may comprise more or fewer upper mounting brackets 256 that may be coupled to various other panels, including top panel 214, third side panel 208, and fourth side panel 210. Upper mounting brackets 256 can be formed integrally with first side panel 204 and second side panel 206 or can be formed separately from first side panel 204 and second side panel 206 and later coupled to first side panel 204 and second side panel 206 (or any other panel) via one or more fasteners or the like. As illustrated, each upper mounting bracket 256 comprises two vertical stiffening ribs 260 and one horizontal stiffening rib 262. Horizontal stiffening rib 262 may be formed integrally with vertical stiffening ribs 260 or formed separately and later coupled to vertical stiffening ribs 260. Vertical stiffening ribs 260 may be configured to resist vertical tensile and compressive forces caused by vertical shifting of battery pack assembly 200 as electric vehicle 100 operates (for example, as electric vehicle 100 moves along an uneven or bumpy road surface). Horizontal stiffening ribs 262 may be configured to resist horizontal tensile and compressive forces caused by horizontal movement of battery pack assembly 200 as electric vehicle 100 operates (for example, as electric vehicle 100 accelerates or decelerates). Together, vertical stiffening ribs 260 and horizontal stiffening ribs 262 may also resist torsion forces caused by rotational movements of battery pack assembly 200.

In various embodiments, each vertical stiffening rib 260 comprises a horizontally extending aperture 264 configured to reduce the weight of battery pack enclosure 202. For example, as illustrated, each vertical stiffening rib 260 comprises a horizontally extending aperture 264 situated above horizontal stiffening rib 262; however, it should be appreciated that each vertical stiffening rib 260 may comprise multiple horizontally extending apertures 264 above and/or below horizontal stiffening rib 262.

In various embodiments, each horizontal stiffening rib 262 comprises a vertically extending aperture 266 configured to receive at least one fastener. For example, in various embodiments, vertically extending aperture 266 may be configured to receive a bolt configured to removably couple battery pack assembly 200 to battery frame assembly 106. In various embodiments, the bolt (or other suitable mechanical fastener) may be configured to be inserted into vertically extending aperture 266 in a direction from top panel 214 to bottom panel 216, thereby allowing the bolt to be accessed from the top of battery pack assembly 200. In such a way, production and service staff may quickly and efficiently couple battery pack assembly 200 to (and decouple battery pack assembly 200 from) battery frame assembly 106 within minimal vehicle downtime.

In various embodiments, battery enclosure 202 further comprises lower mounting brackets 258. As illustrated, battery enclosure 202 comprises two lower mounting brackets 258 with one lower mounting bracket 258 coupled to each lower corner of second side panel 206; however, it should be appreciated that battery enclosure 202 is not limited in this regard and may comprise more or fewer lower mounting brackets 258 that can be coupled to various other panels, including bottom panel 216, third side panel 208, and fourth side panel 210. Lower mounting brackets 258 can be formed integrally with second side panel 206 or can be formed separately from second side panel 206 and later coupled to second side panel 206 (or any other panel) via one or more fasteners or the like. As illustrated, each lower mounting bracket 258 comprises a single vertical stiffening rib 268; however, lower mounting brackets 258 are not limited in this regard and may comprise multiple vertical stiffening ribs and/or horizontal stiffening ribs. Vertical stiffening rib 268 may be configured to resist vertical tensile and compressive forces caused by vertical shifting of battery pack assembly 200 as electric vehicle 100 operates (for example, as electric vehicle 100 moves along an uneven or bumpy road surface). In various embodiments, each vertical stiffening rib 268 comprises a horizontally extending aperture 274 configured to receive at least one fastener to assist in coupling battery pack assembly 200 to battery frame assembly 106.

Battery enclosure 202 further comprises one or more vents. In various embodiments, battery enclosure 202 comprises a first vent 276 coupled to and extending through first side panel 204. First vent 276 may be centered horizontally (Y-direction as illustrated) and positioned above and adjacent to junction box panel 218. Battery enclosure 202 may further comprise a second vent 278 and a third vent 280. Second vent 278 and third vent 280 are coupled to and extend through second side panel 206 and are positioned a similar distance from top panel 214 and bottom panel 216. Second vent 278 and third vent 280 are adjacent to each other in the horizontal direction. Each of first vent 276, second vent 278, and third vent 280 comprise a membrane configured to permit airflow while filtering out potentially harmful molecules. In various embodiments, each of first vent 276, second vent 278, and third vent 280 comprise a hydrophobic and chemically inert material such as an expanded polytetrafluoroethylene material. In the event of thermal runaway of one or more cells in battery pack assembly 200, first vent 276, second vent 278, and third vent 280 may be configured to permit combustion gases to exit battery enclosure 202, thereby resulting in pressure equalization, reducing the risk of explosion of battery pack assembly 200. In various embodiments, each of first vent 276, second vent 278, and third vent 280 are covered by a vent shield 282 configured to prevent the vents from clogging from airborne particulates. While illustrated as comprising one vent coupled to first side panel 204 and two vents coupled to second side panel 206, battery enclosure 202 is not limited in this regard and may comprise more or fewer vents coupled to any of first side panel 204, second side panel 206, third side panel 208, fourth side panel 210, top panel 214, bottom panel 216, or junction box panel 218. For example, in various embodiments, bottom panel 216 comprises a vent configured to allow flames and hot gases to escape toward the ground surface. While discussed herein as comprising external vents coupled to battery enclosure 202, battery pack assembly 200 is not limited in this regard and may additionally or alternatively comprise one or more vents coupled to battery modules.

With primary reference to FIG. 4G and FIGS. 5A-5E, battery pack assembly 200 is illustrated with various panels removed. More specifically, FIG. 4G illustrates battery pack assembly 200 with third side panel 208, fourth side panel 210, and junction box panel 218 removed. FIGS. 5A-5E illustrate battery pack assembly 200 with first side panel 204, second side panel 206, third side panel 208, fourth side panel 210, top panel 214, bottom panel 216, and junction box panel 218 removed. For illustration purposes, the internal contents of battery pack assembly 200 are removed in FIG. 4G apart from a plurality of module cooling plates 302 (to indicate positioning and orientation of one or more battery modules), while FIGS. 5A-5E illustrate substantially complete internal contents of battery pack assembly 200.

Battery pack assembly 200 (and battery enclosure 202) is configured to house one or more battery modules 300. Battery modules 300 contain one or more secondary (or rechargeable) battery cells configured to store and provide electrical power to high voltage systems of electric vehicle 100. For example, in various embodiments, battery modules 300 may comprise a plurality of battery cells that may be electrically coupled in series and/or parallel to achieve a desired output voltage and current. In various embodiments, each battery module 300 may be configured with a capacity of between 100 amp-hours (Ah) and 130 Ah, a voltage of between 50 V and 150 V, and a net energy of between 5 kilowatt-hours (kWh) and 15 kWh. As will be discussed in additional detail below, battery modules 300 can be electrically coupled in series and/or parallel to achieve a desired output voltage and current. In various embodiments, battery pack assembly 200 can be configured with a capacity of between 100 Ah and 130 Ah, a voltage of between 700 V and 900 V, and a net energy of between 40 kWh and 120 kWh.

In various embodiments, battery pack assembly 200 comprises eight battery modules 300-1 through 300-8. For example, battery pack assembly 200 comprises a first battery module 300-1, a second battery module 300-2, a third battery module 300-3, a fourth battery module 300-4, a fifth battery module 300-5, a sixth battery module 300-6, a seventh battery module 300-7, and an eighth battery module 300-8. In various embodiments, first battery module 300-1, second battery module 300-2, third battery module 300-3, and fourth battery module 300-4 are electrically coupled in series to form a first module subassembly while fifth battery module 300-5, sixth battery module 300-6, seventh battery module 300-7, and eighth battery module 300-8 are electrically coupled in series to form a second module subassembly. In various embodiments, the first module subassembly and the second module subassembly are electrically coupled in series to form a battery module assembly.

While illustrated and discussed herein as comprising eight battery modules, battery pack assembly 200 is not limited in this regard and may comprise any number of battery modules 300-n, which can vary depending on the nominal voltage and current of the battery cells, the circuitry of the cells within the module, the power requirements of electric vehicle 100, and other factors. Moreover, while illustrated as comprising substantially identical battery modules, battery pack assembly 200 is not limited in this regard and the specifications of various battery modules may differ from each other. For example, in various embodiments, battery modules 300 may differ in type of cell (i.e., chemistry, structure, nominal voltage, nominal current), orientation of cells, number of cells, electrical connections of cells, size and shape of the module housing, and/or other details.

As illustrated herein, each battery module 300 comprises a generally cuboid geometry having a height (Z-direction as illustrated for battery modules 300-1 through 300-7 and X-direction as illustrated for battery module 300-8), width (X-direction as illustrated for battery modules 300-1 through 300-7 and Z-direction as illustrated for battery module 300-8), and length (Y-direction as illustrated for battery modules 300-1 through 300-8). In various embodiments, the width of each battery module 300 is greater than the height of each battery module 300 and the length of each battery module 300 is greater than the width of each battery module 300. The length of each battery module 300 may be substantially similar to the overall length of battery pack assembly 200 and the width of each battery module 300 may be substantially similar to the width of bottom panel 216. In such a way, battery modules 300 may be packaged in battery pack assembly 200 in a compact manner. Each battery module 300 comprises a module housing that comprises one or more sheets of metallic material coupled together and configured to separate the battery cells of one battery module 300 from the battery cells of an adjacent battery module 300.

In various embodiments, at least some of the battery modules 300 can be stacked within battery enclosure 202 to limit the volume occupied by battery modules 300. For example, in various embodiments, a bottom surface of first battery module 300-1 is positioned vertically above and adjacent to an internal surface of bottom panel 216. A bottom surface of second battery module 300-2 is positioned vertically above and adjacent to a top surface of first battery module 300-1. A bottom surface of third battery module 300-3 is positioned vertically above and adjacent to a top surface of second battery module 300-2. A bottom surface of fourth battery module 300-4 is positioned vertically above and adjacent to a top surface of third battery module 300-3. A bottom surface of fifth battery module 300-5 is positioned vertically above and adjacent to a top surface of fourth battery module 300-4. A bottom surface of sixth battery module 300-6 is positioned vertically above and adjacent to a top surface of fifth battery module 300-5. A bottom surface of seventh battery module 300-7 is positioned vertically above and adjacent to top surface of sixth battery module 300-6. A top surface of seventh battery module 300-7 is positioned vertically below and adjacent to an internal surface of top panel 214. In various embodiments, each battery module of first battery module 300-1 through seventh battery module 300-7 are oriented in a first configuration and form a battery module column.

A bottom surface of eighth battery module 300-8 is positioned adjacent to a vertically oriented, internal dividing panel 304 and a top surface of eighth battery module 300-8 is positioned adjacent to an internal surface of second side panel 206. Stated otherwise, eighth battery module 300-8 may be rotated approximately 90 degrees (for example, about the Y-axis in a clockwise direction or a counterclockwise direction) relative to battery modules 300-1 through 300-7. In various embodiments, eighth battery module 300-8 overlaps vertically with at least a portion of third battery module 300-3, fourth battery module 300-4, fifth battery module 300-5, sixth battery module 300-6, and seventh battery module 300-7. However, the positioning of eighth battery module 300-8 is not limited in this regard and may overlap with any of the battery modules, including first battery module 300-1 and second battery module 300-2. A horizontally oriented, internal dividing panel 306 separates eighth battery module 300-8 from the internal contents of junction box 600. In various embodiments, the battery modules 300 may be in direct contact with each other (and/or the panels of battery enclosure 202) or may be spaced apart from each other (and/or the panels of battery enclosure 202) with thermal barrier layers or unoccupied spaces, for example to reduce conductive heat transfer between the battery modules. In various embodiments, eighth battery module 300-8 has a second orientation different from the first orientation of first battery module 300-1 through seventh battery module 300-7. In various embodiments, eighth battery module 300-8 may be stacked vertically on seventh battery module 300-7 similar to the remaining battery modules and have an orientation the same as the first orientation of first battery module 300-1 through seventh battery module 300-7.

Battery modules 300 may be removably coupled to battery enclosure 202 in any suitable manner. In various embodiments, battery pack assembly 200 comprises one or more side rails 284, which may be integral with one or more panels of battery enclosure 202, integral with battery modules 300, or separate components mechanically coupled to battery enclosure 202 and battery modules 300. In various embodiments, battery pack assembly 200 may be devoid of side rails 284 and battery modules 300 may be coupled directly to various panels of battery enclosure 202. In various embodiments, battery pack assembly 200 comprises a first side rail 284-1 and a second side rail 284-2 configured to be coupled to first battery module 300-1, a third side rail 284-3 and a fourth side rail 284-4 configured to be coupled to second battery module 300-2, a fifth side rail 284-5 and a sixth side rail 284-6 configured to be coupled to third battery module 300-3, a seventh side rail 284-7 and an eighth side rail 284-8 configured to be coupled to fourth battery module 300-4, a ninth side rail 284-9 and a tenth side rail 284-10 configured to be coupled to fifth battery module 300-5, an eleventh side rail 284-11 and a twelfth side rail 284-12 configured to be coupled to sixth battery module 300-6, a thirteenth side rail 284-13 and a fourteenth side rail 284-14 configured to be coupled to seventh battery module 300-7, and a fifteenth side rail 284-15 and a sixteenth side rail 284-16 configured to be coupled to eighth battery module 300-8.

Each side rail 284 may comprise a groove 286 which may be configured to mechanically interface with various side panels of battery enclosure 202 and a tongue 288 which may be configured to interface with various battery modules 300; however, slotted side rails 284 are not limited in this regard and may comprise two grooves, two tongues, or the groove and the tongue may be swapped and configured to be coupled to battery modules 300 and side panels of battery enclosure 202, respectively. In various embodiments, each groove 286 and tongue 288 may extend along an entire length (Y-direction as illustrated).

Battery enclosure 202 may further comprise one or more tabs 290. In various embodiments, second side panel 206 comprises a first plurality of tabs 290-1 configured to be inserted into groove 286 of first side rail 284-1, a third plurality of tabs 290-3 configured to be inserted into groove 286 of third side rail 284-3, a fifth plurality of tabs 290-5 configured to be inserted into groove 286 of fifth side rail 284-5, a seventh plurality of tabs 290-7 configured to be inserted into groove 286 of seventh side rail 284-7, a ninth plurality of tabs 290-9 configured to be inserted into groove 286 of ninth side rail 284-9, an eleventh plurality of tabs 290-11 configured to be inserted into groove 286 of eleventh side rail 284-11, and a thirteenth plurality of tabs 290-13 configured to be inserted into groove 286 of thirteenth side rail 284-13.

Similarly, vertically oriented, internal dividing panel 304 comprises a second plurality of tabs 290-2 configured to be inserted into groove 286 of second side rail 284-2, a fourth plurality of tabs 290-4 configured to be inserted into groove 286 of fourth side rail 284-4, a sixth plurality of tabs 290-6 configured to be inserted into groove 286 of sixth side rail 284-6, an eighth plurality of tabs 290-8 configured to be inserted into groove 286 of eighth side rail 284-8, a tenth plurality of tabs 290-10 configured to be inserted into groove 286 of tenth side rail 284-10, a twelfth plurality of tabs 290-12 configured to be inserted into groove 286 of twelfth side rail 284-12, and a fourteenth plurality of tabs 290-14 configured to be inserted into slot 286 of fourteenth side rail 284-14. Top panel 241 comprises a fifteenth plurality of tabs 290-15 configured to be inserted into groove 286 of fifteenth side rail 284-15 and horizontally oriented, internal dividing panel 306 comprises a sixteenth plurality of tabs 290-16 configured to be inserted into groove 286 of sixteenth side rail 284-16. While discussed herein as comprising a plurality of tabs 290, battery pack assembly 200 is not limited in this regard and may comprise a single tab in place of each plurality of tabs.

In various embodiments, tongue 288 of first side rail 284-1 is configured to be inserted into a first groove in first battery module 300-1 and tongue 288 of second side rail 284-2 is configured to be inserted into a second groove in first battery module 300-1. Tongue 288 of third side rail 284-3 is configured to be inserted into a first groove in second battery module 300-2 and tongue 288 of fourth side rail 284-4 is configured to be inserted into a second groove in second battery module 300-2. Tongue 288 of fifth side rail 284-5 is configured to be inserted into a first groove in third battery module 300-3 and tongue 288 of sixth side rail 284-6 is configured to be inserted into a second groove in third battery module 300-3. Tongue 288 of seventh side rail 284-7 is configured to be inserted into a first groove in fourth battery module 300-4 and tongue 288 of eighth side rail 284-8 is configured to be inserted into a second groove in fourth battery module 300-4. Tongue 288 of ninth side rail 284-9 is configured to be inserted into a first groove in fifth battery module 300-5 and tongue 288 of tenth side rail 284-10 is configured to be inserted into a second groove in fifth battery module 300-5. Tongue 288 of eleventh side rail 284-11 is configured to be inserted into a first groove in sixth battery module 300-6 and tongue 288 of twelfth side rail 284-12 is configured to be inserted into a second groove in sixth battery module 300-6. Tongue 288 of thirteenth side rail 284-13 is configured to be inserted into a first groove in seventh battery module 300-7 and tongue 288 of fourteenth side rail 284-14 is configured to be inserted into a second groove in seventh battery module 300-7. Finally, tongue 288 of fifteenth side rail 284-15 is configured to be inserted into a first groove in eighth battery module 300-8 and tongue 288 of sixteenth side rail 284-16 is configured to be inserted into a second groove in eighth battery module 300-8.

Battery pack assembly 200 further comprises one or more fasteners configured to mechanically and removably couple together battery enclosure 202, side rails 284, and battery modules 300. For example, in various embodiments, battery pack assembly 200 further comprises a plurality of fasteners extending through one or more of first side panel 204, second side panel 206, top panel 214, vertically oriented, internal dividing panel 304 and/or horizontally oriented, internal dividing panel 306. The fasteners may be configured to be inserted through the various panels of battery enclosure 202, through side rails 284, and into battery modules 300. In various embodiments, the fasteners may extend through an upward extending (Z-direction as illustrated) flange or downward extending flange of each side rail 284.

Due to the arrangement and structures of the components outlined above, battery modules 300 may be coupled to, and decoupled from, battery pack assembly 200 in a timely manner. For example, in the event one or more battery modules 300 need to be removed from and/or replaced in battery pack assembly 200, third side panel 208 and/or fourth side panel 210 may be decoupled from and removed from the remaining panels of battery enclosure 202. The fasteners coupling together the various side panels, side rails 284, and battery modules 300 may then be removed, thereby permitting the battery modules 300 to be slid out of battery enclosure 202. In various embodiments, battery modules 300 may be removed from battery enclosure 202 with side rails 284 still coupled to the battery modules or may be removed from battery enclosure 202 with side rails 284 still coupled to battery enclosure 202. In various embodiments, the grooves 286 and tongues 288 of side rails 284, the tabs 290 of the various panels of battery enclosure 202, and/or the grooves in battery modules 300 may be configured to assist in guiding battery modules 300 and/or side rails 284 into or out of battery enclosure 202 and may also assist minimizing movement and/or in distributing forces between the various components.

In various embodiments, the one or more cold plates 302 may be internal to battery modules 300 or may be external to battery modules 300. Cold plates 302 may be separate components from battery modules 300 and later coupled to battery modules 300 and/or battery enclosure 202. In various embodiments, battery pack assembly 302 comprises eight cold plates 302 with one cold plate 302 coupled to each battery module 300. In various embodiments, cold plates 302 may be coupled to side rails 284 via one or more welded joints, one or more fasteners, via an adhesive, or the like. However, battery pack assembly 200 is not limited in this regard and each cold plate 302 may be permanently and/or removably coupled to a bottom surface of each battery module 300, for example. As will be discussed in further detail below, cold plates 302 may be configured to receive a coolant from a battery pack thermal system and cool and/or heat battery modules via conductive heat transfer, for example.

Battery pack assembly 200 may further comprise a thermal barrier material between one or more battery modules 300. In various embodiments, battery pack assembly 200 comprises a first thermal barrier material layer above bottom panel 216 and below first battery module 300-1, a second thermal barrier material layer above first battery module 300-1 and below second battery module 300-2, a third thermal barrier material layer above second battery module 300-2 and below third battery module 300-3, a fourth thermal barrier material layer above third battery module 300-3 and below fourth battery module 300-4, a fifth thermal barrier material layer above fourth battery module 300-4 and below fifth battery module 300-5, a sixth thermal barrier material layer above fifth battery module 300-5 and below sixth battery module 300-6, a seventh thermal barrier material layer above sixth battery module 300-6 and below seventh battery module 300-7, an eighth thermal barrier material layer above seventh battery module 300-7 and below top panel 214, a ninth thermal barrier material layer between vertically oriented, internal dividing panel 304 (on either side of vertically oriented, internal dividing panel 304) and eighth battery module 300-8, and a tenth thermal barrier material layer 300-10 between eighth battery module 300-8 and first side panel 204. In various embodiments, the thermal battery material layers may completely encapsulate the various modules or may extend to one or more sides of each battery module 300.

Figure 5A:
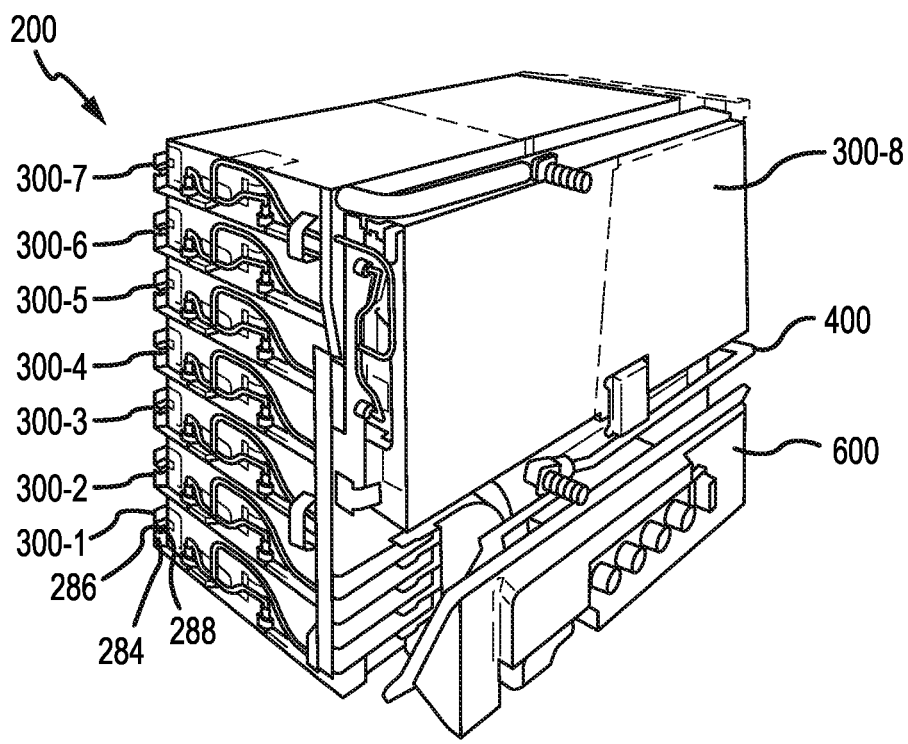
FIG. 5A illustrates a perspective view of a battery pack assembly with a battery enclosure removed, in accordance with various embodiments.
Figure 5B:
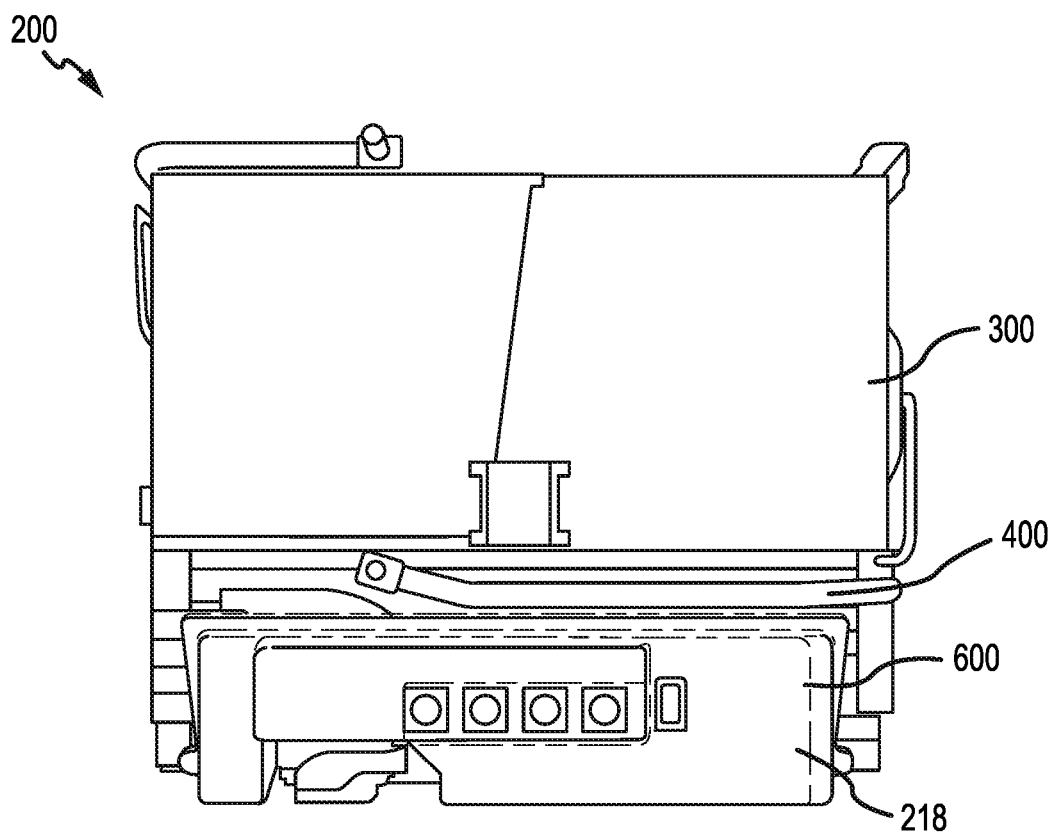
FIG. 5B illustrates a first side view of a battery pack assembly with a battery enclosure removed, in accordance with various embodiments.
Figure 5C:
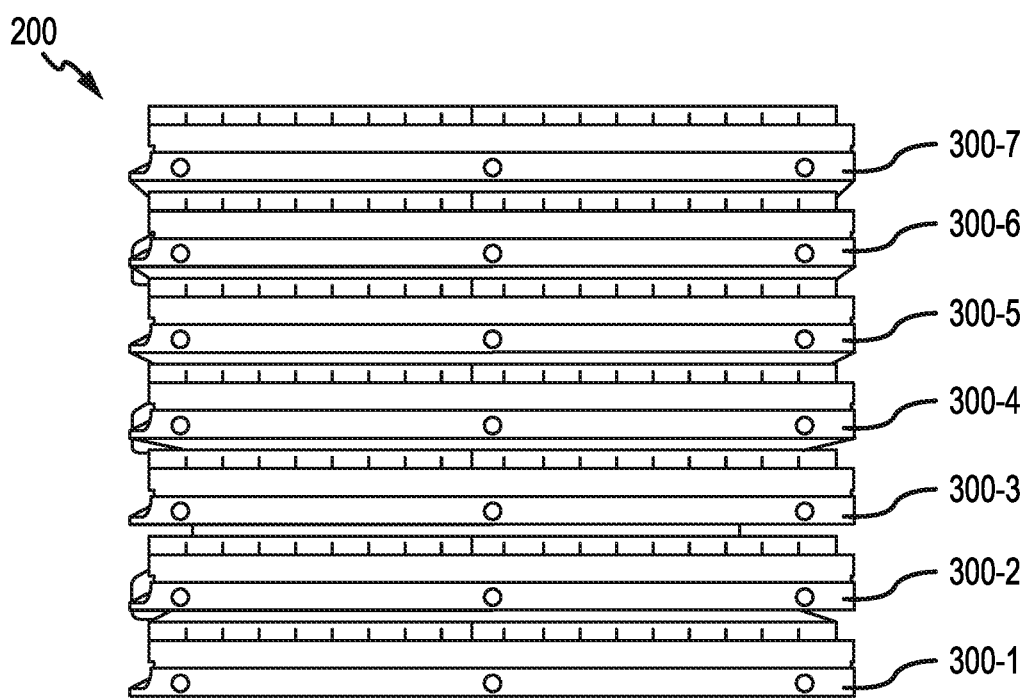
FIG. 5C illustrates a second side view of a battery pack assembly with a battery enclosure removed, in accordance with various embodiments.
Figure 5D:
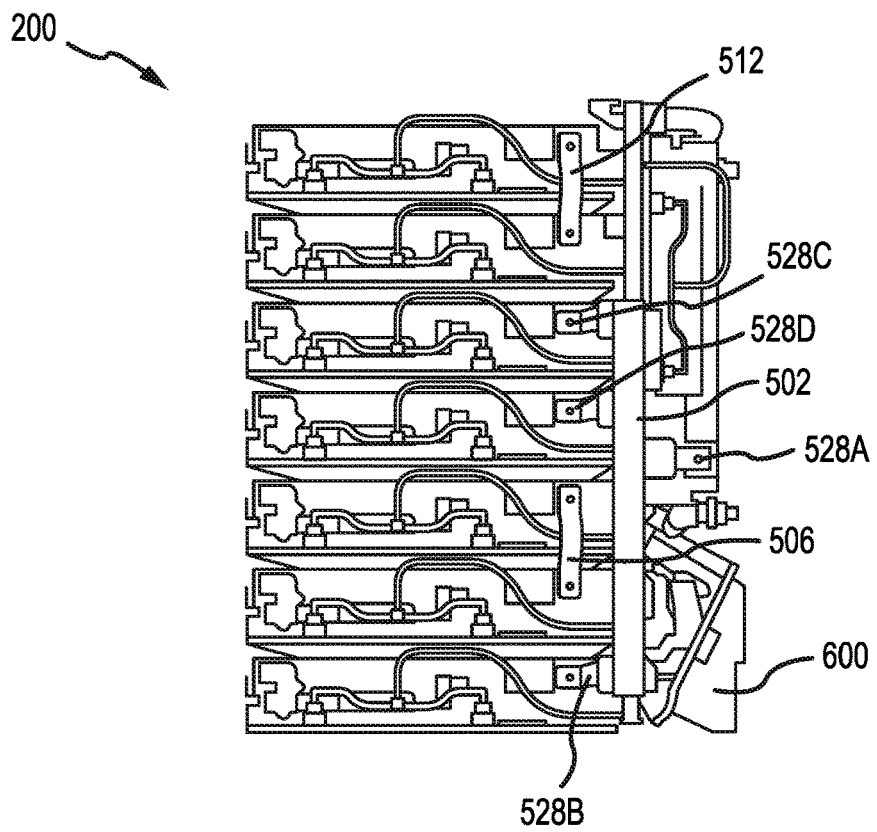
FIG. 5D illustrates a third side view of a battery pack assembly with a battery enclosure removed, in accordance with various embodiments.
Figure 5E:
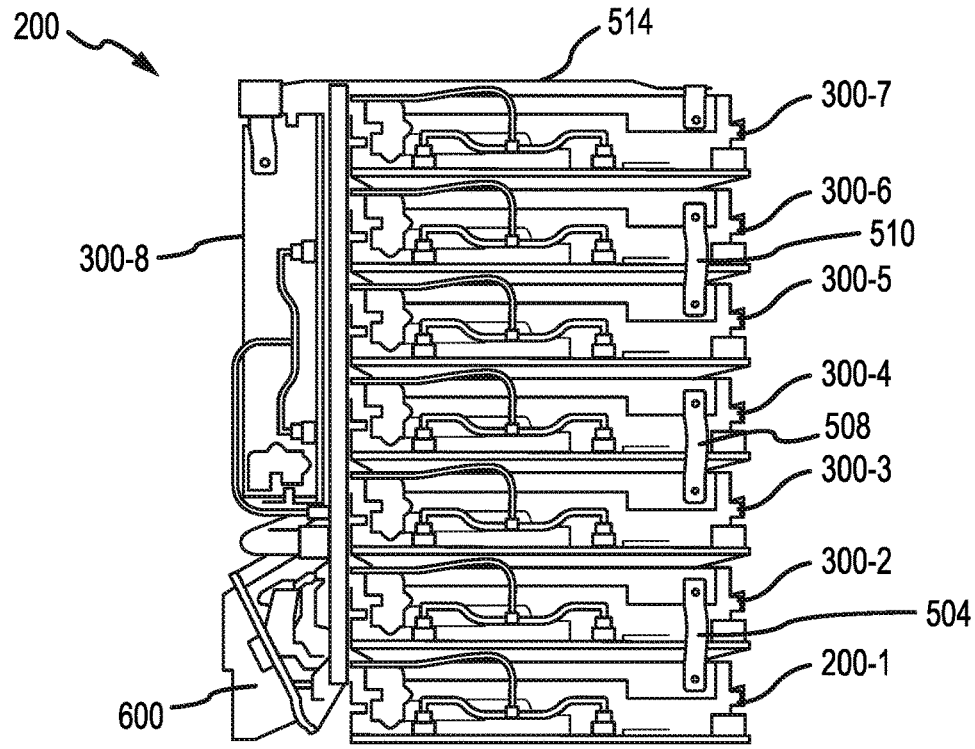
FIG. 5E illustrates a fourth side view of a battery pack assembly with a battery enclosure removed, in accordance with various embodiments.
Figure 6A:
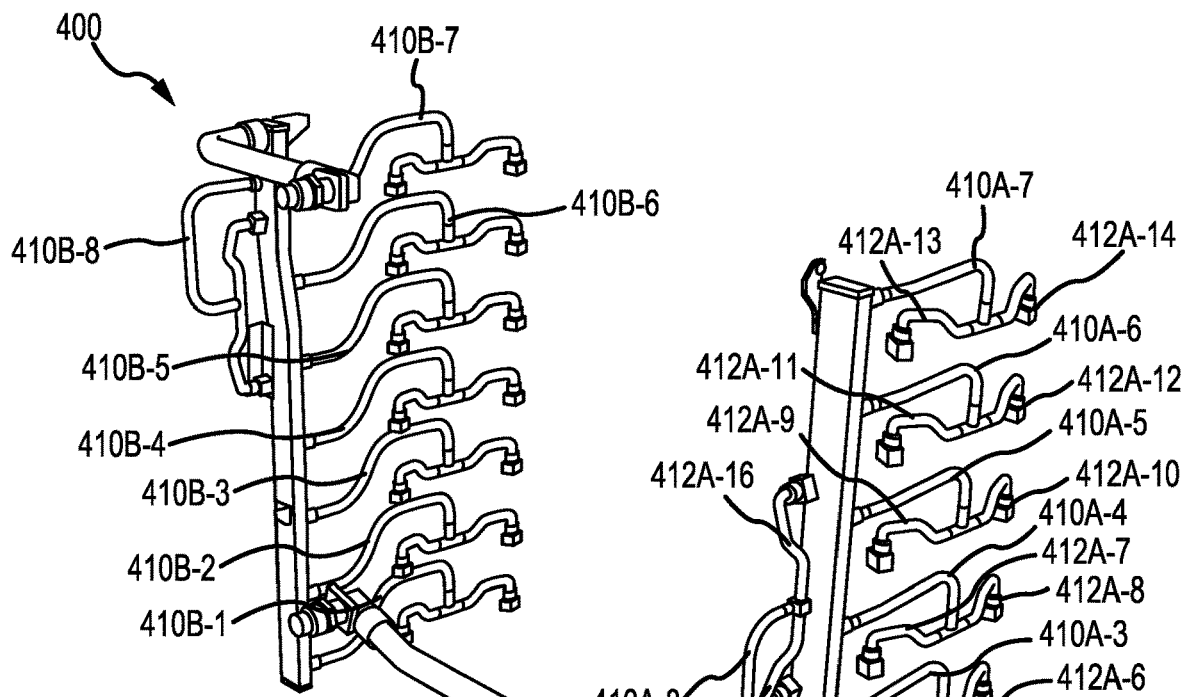
FIG. 6A illustrates a perspective view of a battery pack assembly thermal system, in accordance with various embodiments.
Figure 6B:
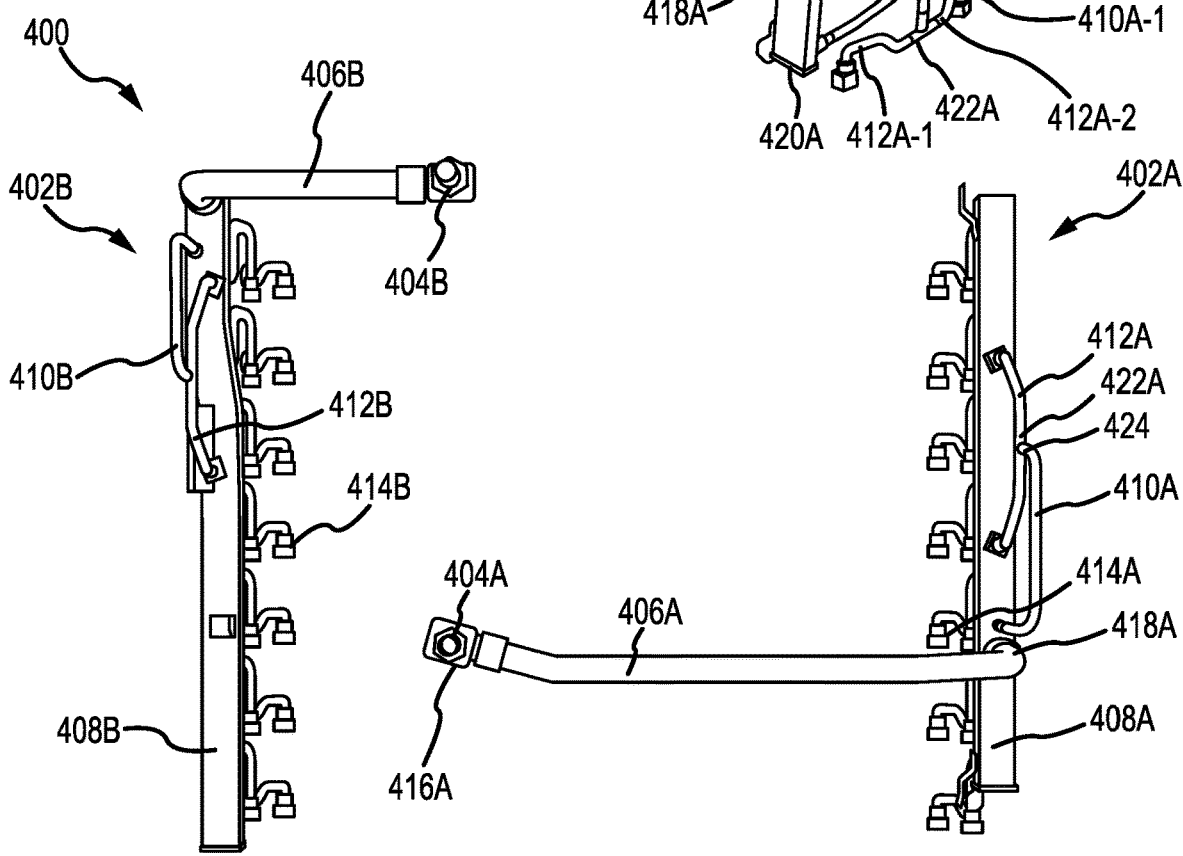
FIG. 6B illustrates a first side view of a battery pack assembly thermal system, in accordance with various embodiments.
Figure 6C:
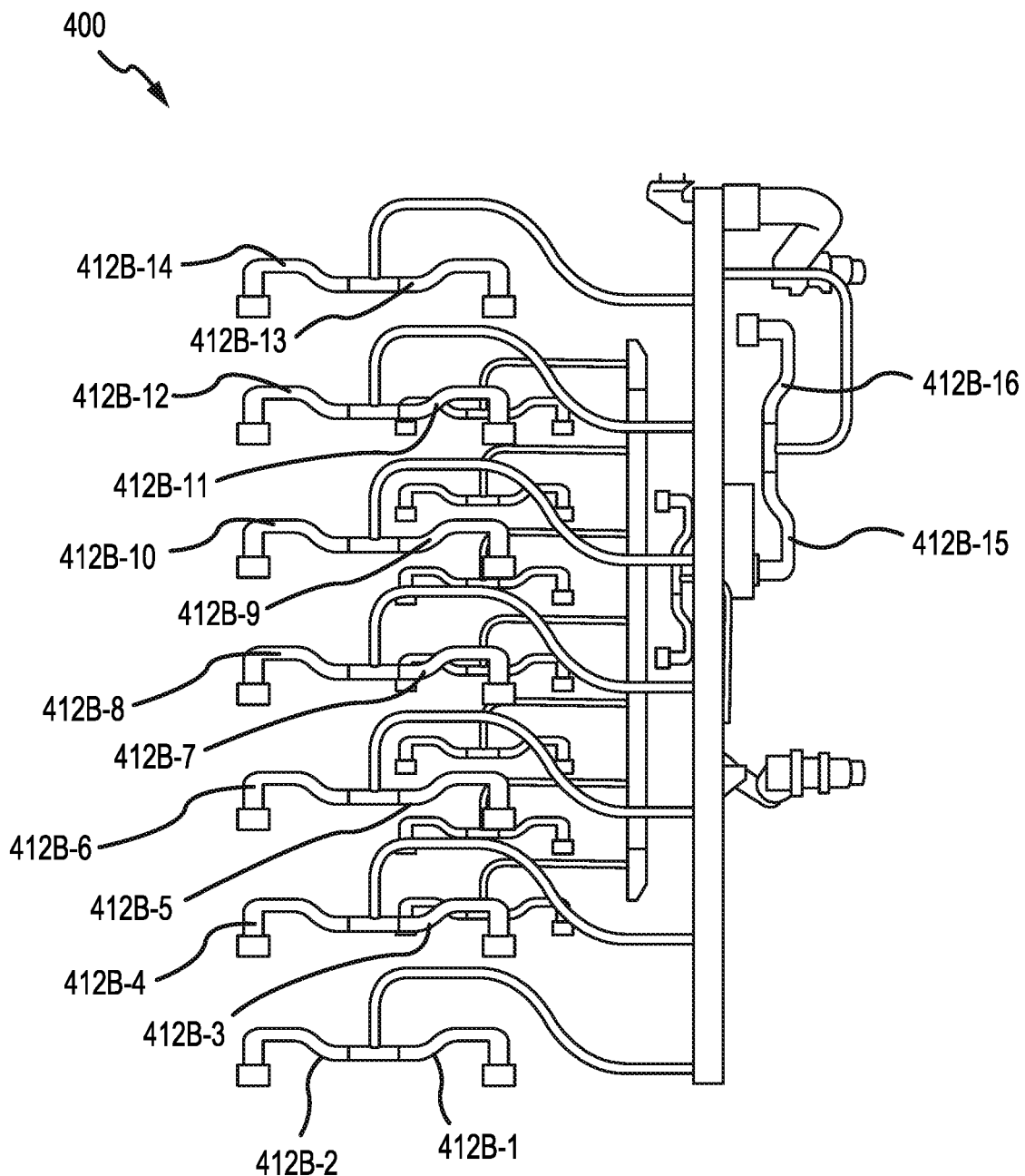
FIG. 6C illustrates a second side view of a battery pack assembly thermal system, in accordance with various embodiments.

Referring still to FIGS. 5A-5E and with additional reference to FIGS. 6A-6C, a battery pack thermal system 400 is illustrated, in accordance with various embodiments. FIGS. 5A-5E illustrate battery pack thermal system 400 thermally coupled to battery modules 300-1 through 300-8, while FIGS. 6A-6C illustrate battery pack thermal system 400 isolated and separated from the remaining components of battery pack assembly 200. Battery pack thermal system 400 is configured to direct a battery coolant to and throughout the various battery modules 300, for example in order to heat battery modules 300 (and battery cells within battery modules 300) in cold ambient conditions and/or start-up of electric vehicle 100. Battery pack thermal system 400 can further be configured to cool battery modules 300 (and battery cells within battery modules 300) in warm to hot ambient conditions and/or times of high-power output of electric vehicle 100. In various embodiments, the coolant within battery pack thermal system 400 comprises a gaseous coolant such as air, helium, or other inert gas, or liquid such as water, ethylene glycol, propylene glycol, betaine, polyalkylene glycol, a combination of any of the above, or other suitable coolant.

Battery pack thermal system 400 comprises a first manifold 402A and a second manifold 402B. First manifold 402A comprises a pack inlet 404A, a first main line 406A, a first manifold body 408A, a first plurality of intermediate lines 410A, a first plurality of distribution lines 412A, and a plurality of manifold inlets 414A. Similarly, second manifold 402B comprises a pack outlet 404B, a second main line 406B, a second manifold body 408B, a second plurality of intermediate lines 410B, a second plurality of distribution lines 412B, and a plurality of manifold outlets 414B. First manifold 402A can be configured to receive coolant from vehicle thermal system 128 and deliver coolant to the various battery modules 300. Second manifold 402B can be configured to receive coolant from the various battery modules 300 and return coolant to vehicle thermal system 128.

In various embodiments, first manifold 402A is positioned proximate to and coupled to the internal surface of third side panel 208, while second manifold 402B is proximate to and coupled to the internal surface of fourth side panel 210. First manifold 402A and second manifold 402B are coupled to third side panel 208 and fourth side panel 210, respectively, via one or more brackets coupled to first manifold body 408A and second manifold body 408B. While discussed herein as being coupled to third side panel 208 and fourth side panel 210, first manifold 402A and second manifold 402B are not limited in this regard and may be coupled to any panel of battery enclosure 202, including first side panel 204, second side panel 206, top panel 214, bottom panel 216, and/or junction box panel 218.

In various embodiments, the first plurality of intermediate lines 410A comprises eight intermediate lines 410A-1 through 410A-8 and the second plurality of intermediate lines 410B comprises eight intermediate lines 410B-1 through 410B-8. For example, the first plurality of intermediate lines 410A comprises a first intermediate line 410A-1 configured to provide coolant to first battery module 300-1, a second intermediate line 410A-2 configured to provide coolant to second battery module 300-2, a third intermediate line 410A-3 configured to provide coolant to third battery module 300-3, a fourth intermediate line 410A-4 configured to provide coolant to fourth battery module 300-4, a fifth intermediate line 410A-5 configured to provide coolant to fifth battery module 300-5, a sixth intermediate line 410A-6 configured to provide coolant to sixth battery module 300-6, a seventh intermediate line 410A-7 configured to provide coolant to seventh battery module 300-7, and an eighth intermediate line 410A-8 configured to provide coolant to eighth battery module 300-8.

Similarly, the second plurality of intermediate lines 410B comprises a first intermediate line 410B-1 configured to receive coolant from first battery module 300-1, a second intermediate line 410B-2 configured to receive coolant from second battery module 300-2, a third intermediate line 410B-3 configured to receive coolant from third battery module 300-3, a fourth intermediate line 410B-4 configured to receive coolant from fourth battery module 300-4, a fifth intermediate line 410B-5 configured to receive coolant from fifth battery module 300-5, a sixth intermediate line 410B-6 configured to receive coolant from sixth battery module 300-6, a seventh intermediate line 410B-7 configured to receive coolant from seventh battery module 300-7, and an eighth intermediate line 410B-8 configured to receive coolant from eighth battery module 300-8. It should be appreciated, however, that the number of intermediate lines in the first plurality of intermediate lines 410A and second plurality of intermediate lines 410B may vary depending on the number of modules in battery pack assembly 200.

In various embodiments, the first plurality of distribution lines 412A comprises sixteen distribution lines 412A-1 through 412A-16 and the second plurality of distribution lines 412B comprises sixteen distribution lines 412B-1 through 412B-16. For example, the first plurality of distribution lines 412A comprises a first distribution line 412A-1 and a second distribution line 412A-2 configured to provide coolant to first battery module 300-1, a third distribution line 412A-3 and a fourth distribution line 412A-4 configured to provide coolant to second battery module 300-2, a fifth distribution line 412A-5 and a sixth distribution line 412A-6 configured to provide coolant to third battery module 300-3, a seventh distribution line 412A-7 and an eighth distribution line 412A-8 configured to provide coolant to fourth battery module 300-4, a ninth distribution line 412A-9 and a tenth distribution line 412A-10 configured to provide coolant to fifth battery module 300-5, an eleventh distribution line 412A-11 and a twelfth distribution line 412A-12 configured to provide coolant to sixth battery module 300-6, a thirteenth distribution line 412A-13 and a fourteenth distribution line 412A-14 configured to provide coolant to seventh battery module 300-7, and a fifteenth distribution line 412A-15 and a sixteenth distribution line 412A-16 configured to provide coolant to eighth battery module 300-8.

Similarly, the second plurality of distribution lines 412B comprises a first distribution line 412B-1 and a second distribution line 412B-2 configured to receive coolant from first battery module 300-1, a third distribution line 412B-3 and a fourth distribution line 412B-4 configured to receive coolant from second battery module 300-2, a fifth distribution line 412B-5 and a sixth distribution line 412B-6 configured to receive coolant from third battery module 300-3, a seventh distribution line 412B-7 and an eighth distribution line 412B-8 configured to receive coolant from fourth battery module 300-4, a ninth distribution line 412B-9 and a tenth distribution line 412B-10 configured to receive coolant from fifth battery module 300-5, an eleventh distribution line 412B-11 and a twelfth distribution line 412B-12 configured to receive coolant from sixth battery module 300-6, a thirteenth distribution line 412B-13 and a fourteenth distribution line 412B-14 configured to receive coolant from seventh battery module 300-7, and a fifteenth distribution line 412B-15 and sixteenth distribution line 412B-16 configured to receive coolant from eighth battery module 300-8. It should be appreciated, however, that the number of distribution lines in the first plurality of distribution lines 412A and second plurality of distribution lines 412B may vary depending on the number of modules in battery pack assembly 200.

In various embodiments, the plurality of manifold inlets 414A comprises sixteen manifold inlets, with one manifold inlet 414A coupled to each distribution line 412A of the first plurality of distribution lines 412A. Likewise, the plurality of manifold outlets 414B comprises sixteen manifold outlets, with one manifold outlet 414B coupled to each distribution line 412B of the second plurality of distribution lines 412B. Manifold inlets 414A may be the same as or different from manifold outlets 414B. In various embodiments, each manifold inlet 414A and each manifold outlet 414B comprises an elbow fitting comprising a quick disconnect coupling on a first end configured to be removably coupled to an associated battery module thermal inlet or outlet and a male barbed end on a second end configured to be inserted into an associated distribution line.

With primary focus on first manifold 402A, pack inlet 404A comprises a fluid fixture which may extend through first side panel 204. In various embodiments, pack inlet 404A may comprise a male fixture configured to interface and fluidly couple to a female fixture of vehicle thermal system 128. While discussed herein as comprising a male fixture, pack inlet 404A is not limited in this regard and may comprise any suitable fixture configured to be fluidly coupled to a counterpart fixture of vehicle thermal system 128. In various embodiments, pack inlet 404A comprises an inlet mounting plate 416A configured to be coupled to the internal surface of first side panel 204. In various embodiments, pack inlet 404A may be coupled to first side panel 204 vertically above and adjacent to junction box 600 and spaced apart and vertically below pack outlet 404B. While discussed herein as being coupled to and extending through first side panel 204, pack inlet 404A (and pack outlet 404B) is not limited in this regard and may be coupled to and extend through any other panel of battery enclosure 202. By positioning pack inlet 404A vertically below pack outlet 404B, air entrainment in battery pack thermal system 400 may be reduced or avoided. For example, a coolant pump fluidly coupled to vehicle thermal system 128 may pump coolant through pack inlet 404A, through battery pack thermal system 400, and out pack outlet 404B. As such, the pump may be configured to pump the coolant in a direction opposite a gravitational force acting on the coolant within battery pack thermal system 400, thereby causing the coolant to flow on an upward pressure gradient which may limit or prevent the formation of air pockets in various portions of battery pack thermal system 400, including in main lines 406A/406B, manifold bodies 408A/408B, intermediate lines 410A/410B, and distribution lines 412A/412B.

A first end of first main line 406A is fluidly coupled to inlet mounting plate 416A and a second end of first main line 406A is fluidly coupled to first manifold body 408A. First main line 406A (and intermediate line 410A and distribution line 412A) may comprise flexible, rigid, or semi-rigid tubes or hoses of any suitable material. In various embodiments, first main line 406A (and intermediate line 410A and distribution line 412A) comprise a coated or uncoated silicone, nylon, ethylene propylene diene monomer (EPDM), nitrile, or other suitable material. In various embodiments, a diameter (inner and outer) of first main line 406A is greater than a diameter (inner and outer) of each intermediate line 410A of the first plurality of intermediate lines 410A and each distribution line 412A of the first plurality of distribution lines 412A. In various embodiments, the diameter of each intermediate line 410A of the first plurality of intermediate lines 410A is equal to the diameter of each distribution line 412A of the first plurality of distribution lines 412A. However, in various embodiments, the diameter of first main line 406A may be equal to the diameter of each intermediate line 410A of the first plurality of intermediate lines 410A and each distribution line 412A of the first plurality of distribution lines 412A. In various embodiments, the diameter of each intermediate line 410A of the first plurality of intermediate lines 410A is greater than the diameter of each distribution line 412A of the first plurality of distribution lines 412A.

First main line 406A is configured to direct coolant to first manifold body 408A through a first manifold body inlet 418A. In various embodiments, first manifold body inlet 418A is positioned on a lower half (or third or quarter) of first manifold body 408A. First manifold body 408A may comprise an elongated, hollow structural section having a substantially rectangular cross-sectional geometry; however, first manifold body 408A is not limited in this regard and may comprise a cross-sectional geometry of any suitable shape (for example, square, circular, elliptical, etc.). Upon pressurization, coolant may occupy an entire internal volume of first manifold body 408A and may be configured to exit first manifold body 408A via a plurality of first manifold body outlets 420A. In various embodiments, first manifold 402A comprises eight first manifold body outlets 420A (one for each battery module 300); however, first manifold body 408A is not limited in this regard and may comprise more or fewer manifold body outlets 420A depending on the number of battery modules in battery pack assembly 200.

First manifold body outlets 420A are configured to direct coolant through each intermediate line 410A of the first plurality of intermediate lines 410A. As previously stated, each intermediate line 410A may comprise a flexible or semi-flexible material enabling each intermediate line 410A to be bent to allow for desired positioning of distribution lines 412A and/or manifold inlets 414A. As illustrated herein, each intermediate line 410A of the first plurality of intermediate lines 410A comprises a downward bend; however, it should be appreciated that each intermediate line 410A of the first plurality of intermediate lines 410A may be bent in a different direction or be straight depending on the orientation of battery modules 300 or positioning of coolant inlets on battery modules 300.

The first plurality of intermediate lines 410A are configured to direct coolant through a plurality of intermediate line outlets 422A to the first plurality of distribution lines 412A. In various embodiments, each intermediate line 410A of the first plurality of intermediate lines 410A is fluidly coupled to a single distribution line 412A of the first plurality of distribution lines 412A via a T-fitting 424. Each T-fitting 424 may comprise an inlet configured to receive coolant from a single intermediate line 410A, and two outlets configured to distribute the coolant to two distribution lines 412A. In various embodiments, T-fitting 424 comprises a barbed fitting having one or more barbed ends configured to be inserted into intermediate line 410A and distribution line 412A. However, T-fittings 424 are not limited in this regard and may comprise any suitable fitting configured to be fluidly coupled with intermediate line 410A and distribution line 412A. Moreover, while discussed herein as comprising T-fittings 424, battery pack thermal system 400 is not limited in this regard and may comprise fittings having more or fewer inlets and/or outlets depending on the number of intermediate lines 410A and/or distribution lines 412A.

The first plurality of distribution lines 412A are configured to direct coolant into battery modules 300 through the plurality of manifold inlets 414A. More specifically, coolant may flow from various T-fittings 424, through the first plurality of distribution lines 412A, through manifold inlets 414A, and into cooling plates present within the various battery modules 300. Each distribution line 412A of the first plurality of distribution lines 412A comprises a first distribution line configured to be coupled to a first portion of an associated battery module 300 and a second distribution line configured to be coupled to a second portion of the associated battery module 300 in order to permit more uniform heat transfer to or from multiple rows and/or columns of battery cells within battery modules 300. While illustrated herein as comprising two distribution lines coupled to each battery module 300, battery pack thermal system 400 is not limited in this regard and may comprise more or fewer distribution lines coupled to each battery module 300. Manifold inlets 414A (and manifold outlets 414B) may be oriented in any direction and may be fluidly coupled to any portion of associated battery modules 300. For example, in various embodiments, the plurality of manifold inlets 414A (and plurality of manifold outlets 414B) may be fluidly coupled to a plurality of coolant inlets (and plurality of coolant outlets) on the plurality of battery modules 300 which may be positioned on a top surface, bottom surface, or any side surface of each of the respective battery modules 300. Moreover, while discussed herein as delivering battery coolant directly to and through cold plates 302 to permit conductive heat transfer between cold plates 302 and battery modules 300, battery pack assembly 200 is not limited in this regard and battery modules 300 may be flooded with battery coolant such that heat is transferred directly to the battery cells without an intermediate cold plate.

While described herein as comprising a first manifold 402A configured to distribute coolant to battery modules 300 and a second manifold 402B configured to receive coolant from battery modules 300, battery pack assembly 200 is not limited in this regard. For example, in various embodiments, battery pack assembly 200 comprises multiple inlet manifolds and multiple outlet manifolds configured to distribute coolant to and receive coolant from battery modules 300, respectively. Moreover, in various embodiments, each manifold (for example, first manifold 402A and second manifold 402B) is configured to both distribute coolant to, and receive coolant from, battery modules 300. For example, in various embodiments, one or more intermediate lines and distribution lines of first manifold 402A and second manifold 402B may be configured to deliver coolant to battery modules 300 while one or more intermediate lines and distribution lines of first manifold 402A and second manifold 402B may be configured to receive coolant from battery modules 300. Stated otherwise, in various embodiments, coolant may be configured to travel in either direction between first manifold 402A and second manifold 402B.

For the sake of brevity, second manifold 402B will not be discussed in detail herein. However, it should be appreciated that second manifold 402B may be substantially similar to first manifold 402A apart from the positioning of second manifold 402B within battery enclosure 202, the positioning of second main line 406B, the direction of coolant flow, the attachment positions of manifold outlets 414B on the various battery modules 300, and the number and direction of bends in distribution lines 412B, intermediate lines 410B, second manifold body 408B, and second main line 406B. In various embodiments, rather than directing coolant to battery modules 300, second manifold 402B may be configured to receive coolant from battery modules 300 and direct the coolant through manifold outlets 414B, through the second plurality of distribution lines 412B, through the second plurality of intermediate lines 410B, through second manifold body 408B, through second main line 406B and out of pack outlet 404B to vehicle thermal system 128 in order to permit the coolant to absorb or dissipate thermal energy (as necessary depending on the need to heat or cool battery pack assembly 200) before returning to battery pack assembly 200.

Referring now to FIGS. 7A-7E, battery pack assembly 200 further comprises an electrical contact assembly 500. In various embodiments, electrical contact assembly 500 comprises a plurality of busbars configured to distribute high voltage electricity to and from battery modules 300. Electrical contact assembly 500 is configured to distribute high voltage electricity to battery modules 300 from an energy source (for example, the grid, one or more batteries, or hydrogen fuel cells) to charge battery modules 300 and to distribute high voltage electricity from battery modules 300 to high voltage systems of electric vehicle 100. As will be described in further detail, electrical contact assembly 500 is electrically coupled to junction box 600 which may assist in managing current flow to, from, and within battery pack assembly 200.

In various embodiments, electrical contact assembly 500 comprises a laminated busbar assembly 502, a first bridge busbar 504, a second bridge busbar 506, a third bridge busbar 508, a fourth bridge busbar 510, a fifth bridge busbar 512, and a sixth bridge busbar 514. In various embodiments, each busbar (or busbar assembly) in electrical contact assembly 500 may comprise an electrically conductive, high strength, low weight material such as copper, brass, aluminum, or a combination thereof. Each busbar in electrical contact assembly 500 comprises a substantially large surface area to cross-sectional area ratio (for example, 2:1 to 10:1) to permit the busbars to efficiently dissipate heat (caused by resistive heating) through convective heat transfer. While discussed herein as comprising a plurality of busbars, electrical contact assembly 500 is not limited in this regard and may comprise wires and/or cables in place of or in addition to busbars. Moreover, while discussed herein as comprising laminated busbar assembly 502, first bridge busbar 504, second bridge busbar 506, third bridge busbar 508, fourth bridge busbar 510, fifth bridge busbar 512, and sixth bridge busbar 514, electrical contact assembly 500 is not limited in this regard and may comprise more or fewer busbars or busbar assemblies depending on the number of modules present in battery pack assembly 200. Moreover, in various embodiments, electrical contact assembly 500 may comprise multiple laminated busbar assemblies electrically coupled to all battery modules 300 and, as a result, may be devoid of bridge busbars separate from the laminated busbar assemblies.

In various embodiments, laminated busbar assembly 502 comprises a plurality of conductive layers 516. For example, in various embodiments, laminated busbar assembly 502 comprises two or more layers of conductive material (configured to increase stiffness and strength and provide a discrete current path), each of which may be separated from an adjacent conductive material layer by an insulating material layer. In various embodiments, the conductive layers 516 comprise an electrically conductive material such as copper, brass, aluminum, or a combination thereof, while the insulating material layers comprise one or more insulating (or dielectric) materials such as an epoxy, polyethylene terephthalate, polyvinyl fluoride, polyethylene naphthalate, or other suitable material or combinations thereof. The insulating material layers may be configured to insulate the conductive material layers such that laminated busbar assembly 502 may be capable of distributing electrical current via a first conductive layer while not distributing electrical current via a second, adjacent conductive layer. Moreover, laminated busbar assembly 502 may be configured to permit current flow in either direction between battery modules 300 and junction box 600.

Figure 7A:
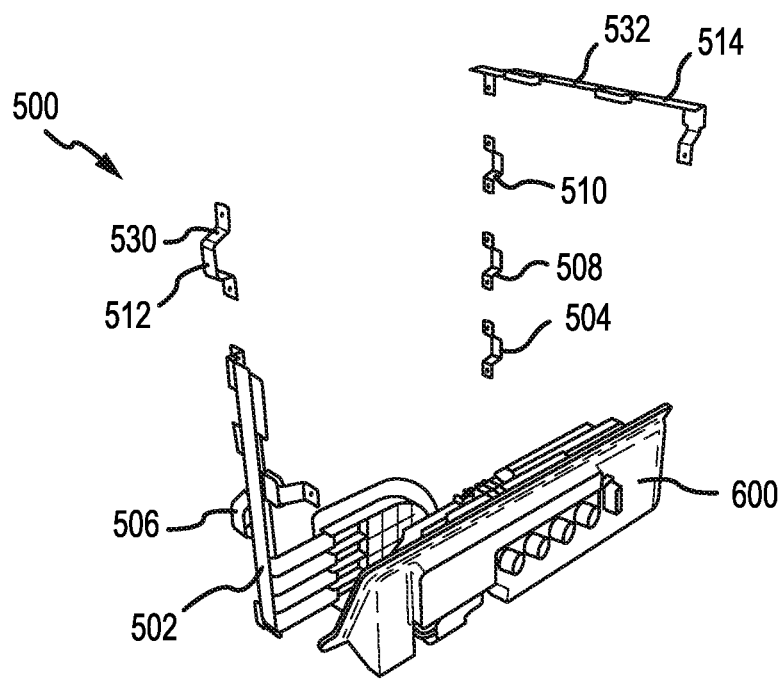
FIG. 7A illustrates a perspective view of an electrical contact assembly and a junction box of a battery pack assembly, in accordance with various embodiments.
Figure 7B:
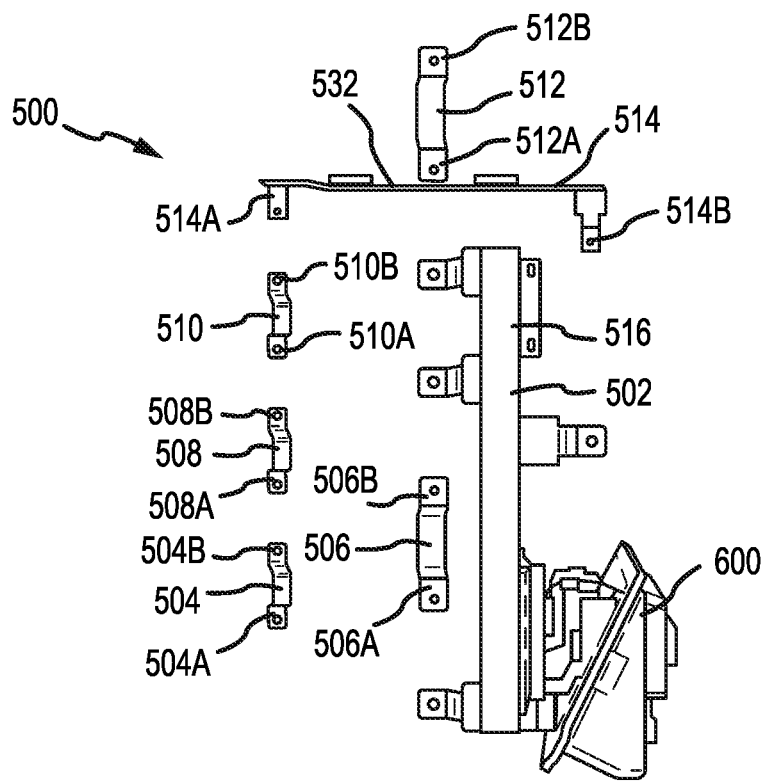
FIG. 7B illustrates a first side view of an electrical contact assembly and a junction box of a battery pack assembly, in accordance with various embodiments.
Figure 7C:
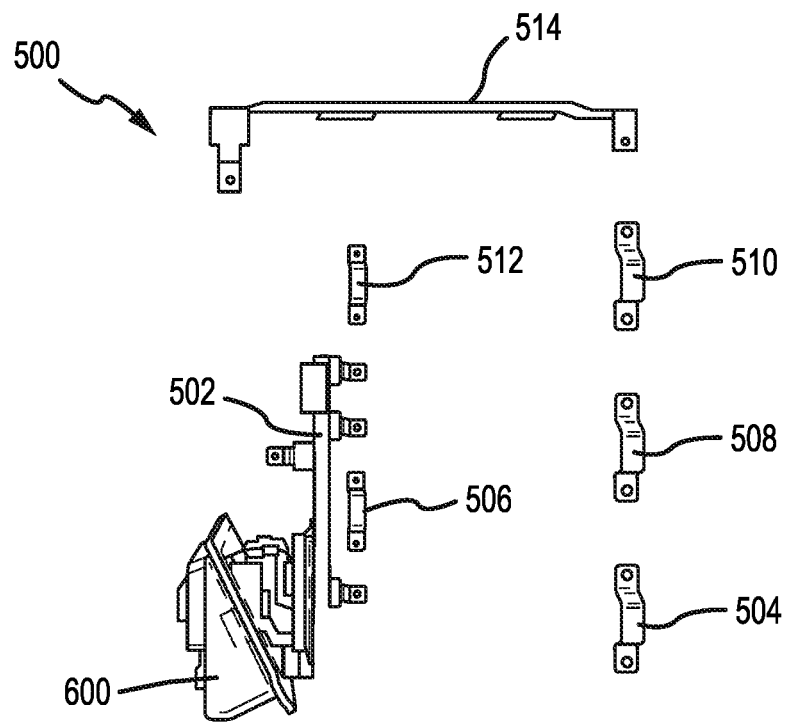
FIG. 7C illustrates a second side view of an electrical contact assembly and a junction box of a battery pack assembly, in accordance with various embodiments.
Figure 7D:
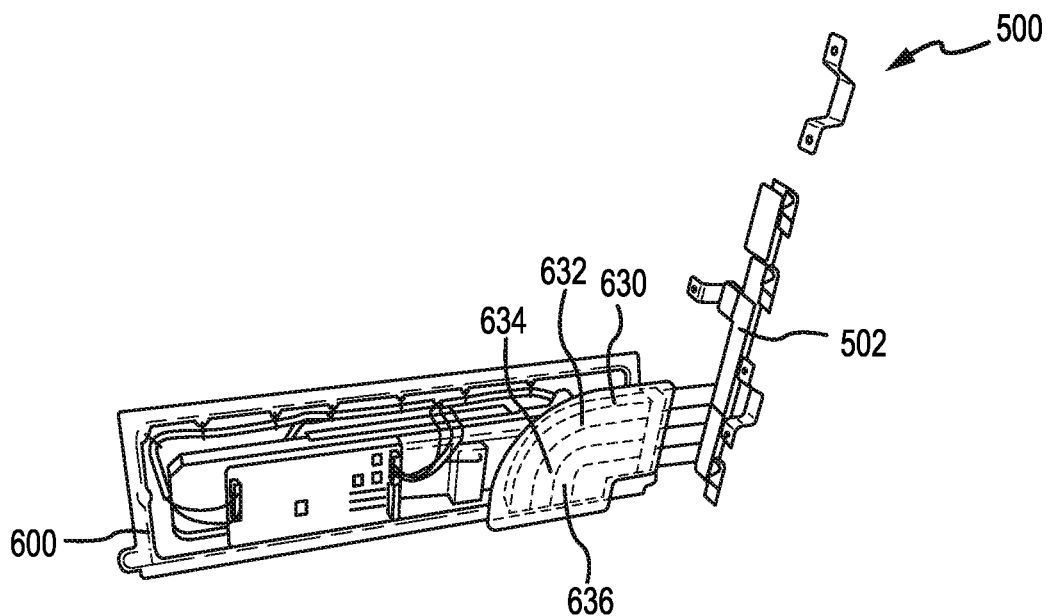
FIG. 7D illustrates a perspective view of an electrical contact assembly and a junction box of a battery pack assembly, in accordance with various embodiments.
Figure 7E:
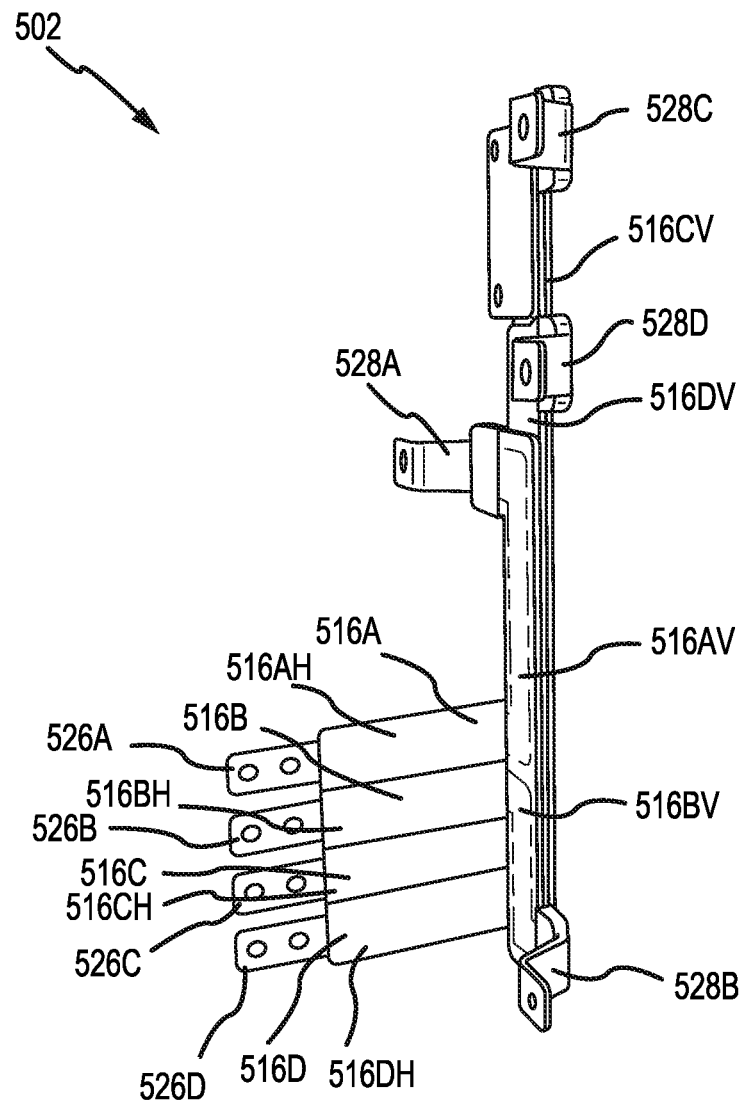
FIG. 7E illustrates a perspective view of a laminated busbar assembly of an electrical contact assembly, in accordance with various embodiments.
Figure 8A:
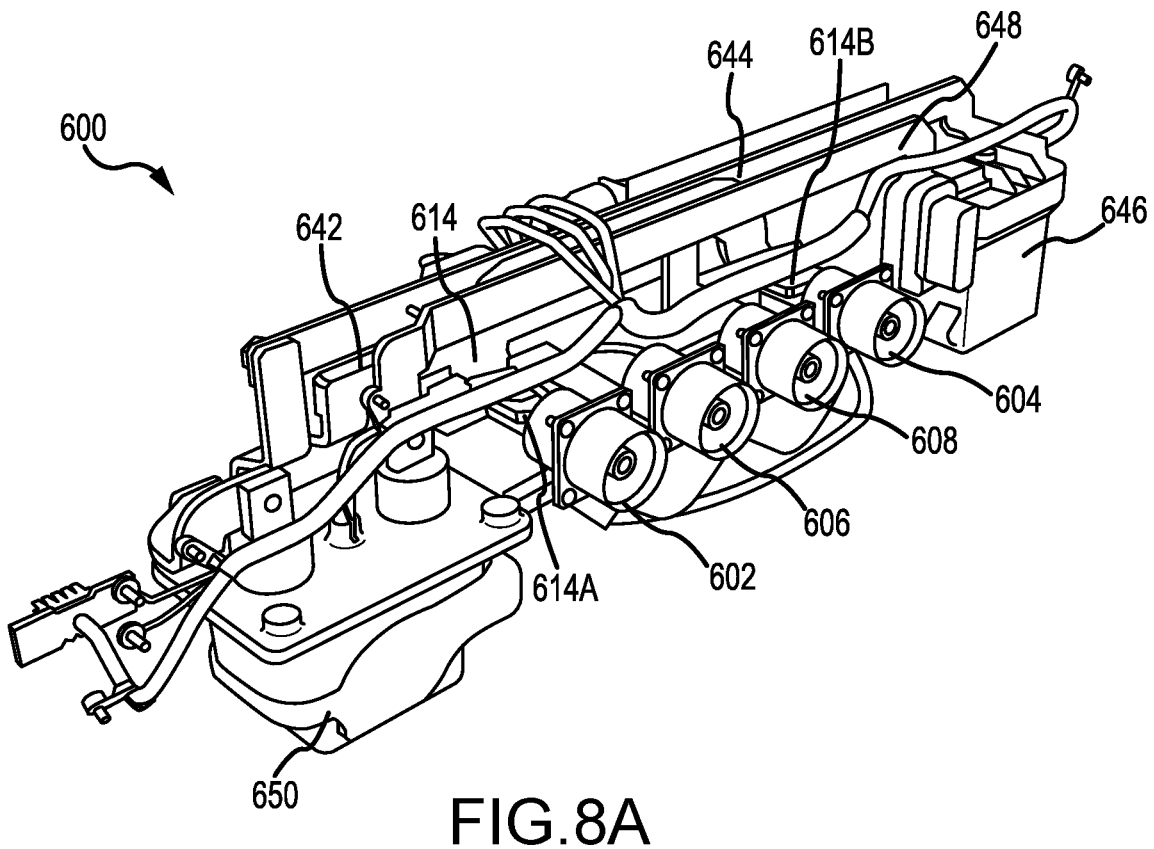
FIG. 8A illustrates a perspective view of a junction box with a junction box panel removed, in accordance with various embodiments.
Figure 8B:
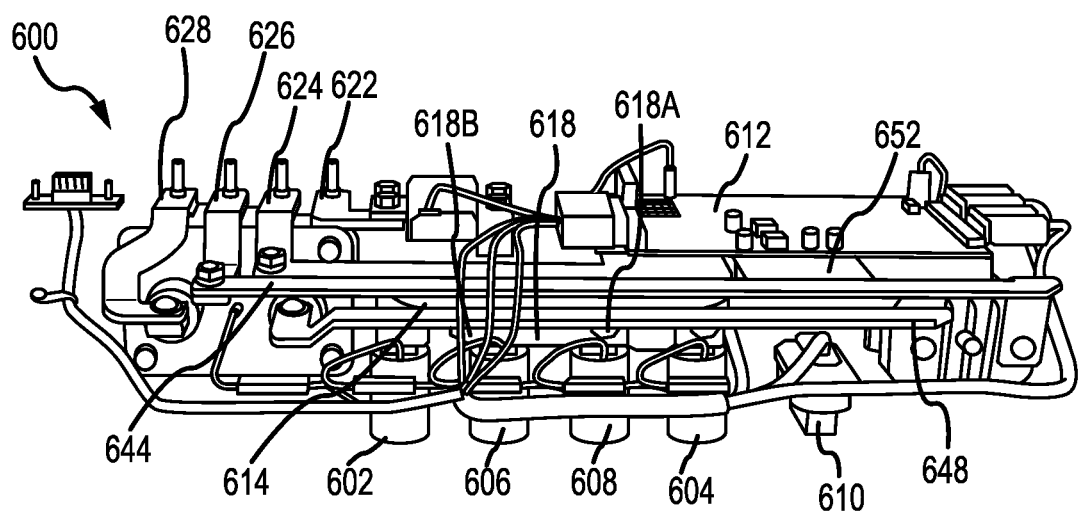
FIG. 8B illustrates a perspective view of a junction box with a junction box panel removed, in accordance with various embodiments.
Figure 8C:
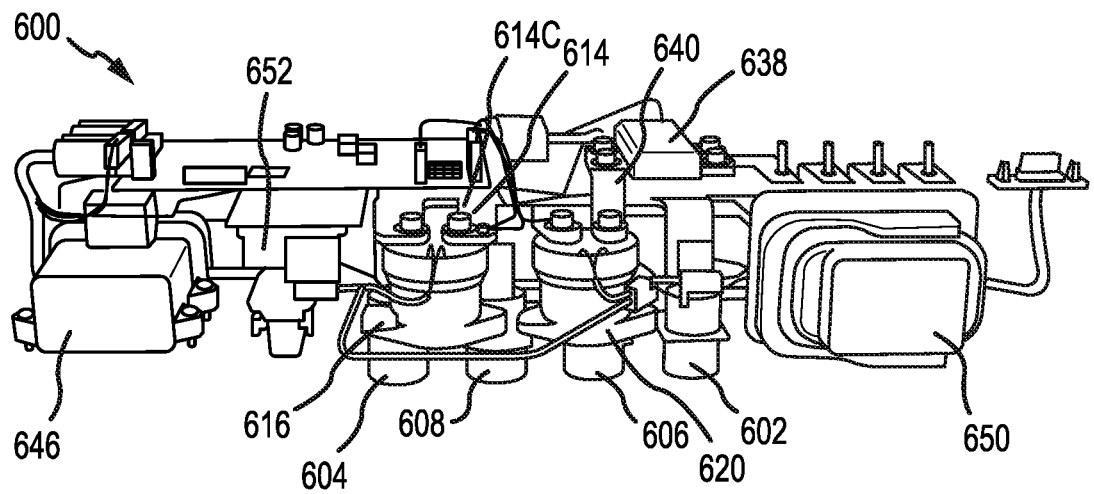
FIG. 8C illustrates a perspective view of a junction box with a junction box panel removed, in accordance with various embodiments.
Figure 8D:
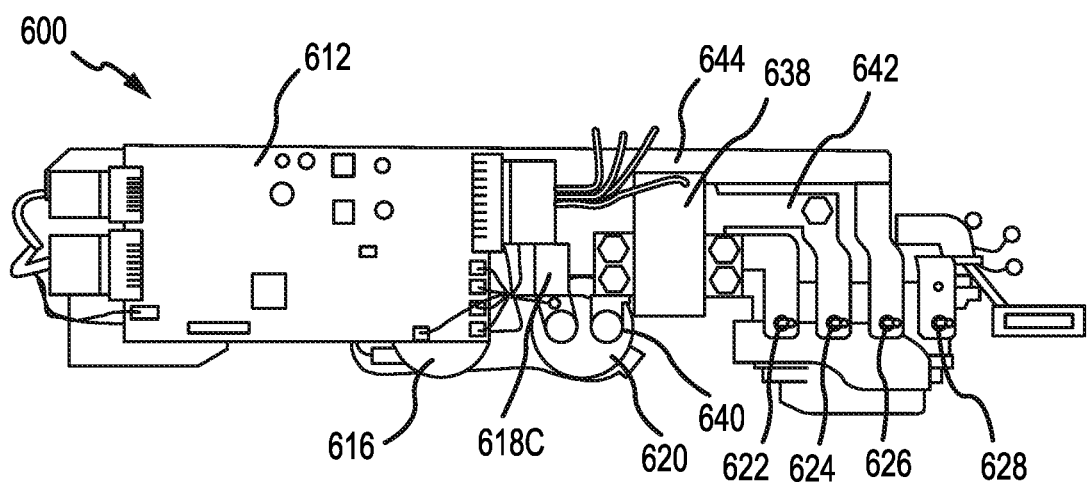
FIG. 8D illustrates a top view of a junction box with a junction box panel removed, in accordance with various embodiments.

With momentary reference to FIG. 7E, laminated busbar assembly 502 comprises a first conductive layer 516A, a second conductive layer 516B, a third conductive layer 516C, and a fourth conductive layer 516D. In various embodiments, laminated busbar assembly 502 comprises more or fewer conductive layers. First conductive layer 516A comprises a horizontal leg 516AH and a vertical leg 516AV. Second conductive layer 516B comprises a horizontal leg 516BH and a vertical leg 516BV. Third conductive layer 516C comprises a horizontal leg 516CH and a vertical leg 516CV. Fourth conductive layer 516D comprises a horizontal leg 516DH and a vertical leg 516DV. In various embodiments, the horizontal and vertical legs of each conductive layer 516 may be formed together or may be formed separately and later coupled (electrically and mechanically) together. In various embodiments, each conductive layer 516 comprises a transition (for example, a 90-degree bend) between its horizontal and vertical legs.

In various embodiments, horizontal leg 516AH of first conductive layer 516A is positioned adjacent to and vertically above horizontal leg 516BH of second conductive layer 516B. Horizontal leg 516BH of second conductive layer 516B is positioned adjacent to and vertically above horizontal leg 516CH of third conductive layer 516C. Horizontal leg 516CH of third conductive layer 516C is positioned adjacent to and vertically above horizontal leg 516DH of fourth conductive layer 516D. In various embodiments, each horizontal leg of first conductive layer 516A, second conductive layer 516B, third conductive layer 516C, and fourth conductive layer 516D comprises a similar horizontal length such that each conductive layer may extend a substantially similar distance into battery pack assembly 200 (for example, from fourth side panel 210 and into battery pack assembly 200 in the Y-direction). Each horizontal leg 516AH-516DH comprises a junction box contact tab 526A-526D located at the end of the horizontal leg configured to be electrically coupled to junction box 600 directly or through a transition busbar, for example.

In various embodiments, vertical leg 516AV of first conductive layer 516A and vertical leg 516BV of second conductive layer 516B extend in opposite directions. For example, as illustrated herein, vertical leg 516AV of first conductive layer 516A extends upward (positive Z-direction as illustrated), while vertical leg 516BV of second conductive layer 516B extends downward (negative Z-direction as illustrated). Vertical leg 516AV of first conductive layer 516A may comprise a vertical length greater than a vertical length of vertical leg 516BV of second conductive layer 516B. Vertical leg 516AV and vertical leg 516BV may be positioned a substantially similar distance from fourth side panel 210 (Y-direction as illustrated). Vertical leg 516AV of first conductive layer 516A is positioned adjacent to and vertically above vertical leg 516BV of second conductive layer 516B.

In various embodiments, vertical leg 516CV of third conductive layer 516C is horizontally adjacent to vertical leg 516DV of fourth conductive layer 516D. Vertical leg 516DV of fourth conductive layer 516D is positioned between vertical leg 516CV of third conductive layer 516C and vertical legs 516AV, 516BV. Stated otherwise, vertical leg 516CV is located a first distance from fourth side panel 210, vertical leg 516DV is located a second distance from fourth side panel 210, and vertical legs 516AV, 516BV are located a third distance from fourth side panel 210, wherein the third distance is greater than the second distance and the second distance is greater than the first distance. Vertical leg 516CV comprises a vertical length greater than a vertical length of vertical leg 516DV, while vertical leg 516DV comprises a vertical length greater than the vertical lengths of both vertical leg 516AV and vertical leg 516BV. Vertical leg 516CV and vertical leg 516DV each extend upward (positive Z-direction as illustrated) similar to vertical leg 516AV.

As previously stated, first conductive layer 516A, second conductive layer 516B, third conductive layer 516C, and fourth conductive layer 516D comprise junction box contact tabs 526A-526D located at the ends of horizontal legs 516AH, 516BH, 516CH, and 516DH, respectively. In various embodiments, first conductive layer 516A further comprises a module contact tab 528A coupled to an end of vertical leg 516AV, second conductive layer 516B further comprises a module contact tab 528B coupled to an end of vertical leg 516BV, third conductive layer 516C further comprises a module contact tab 528C coupled to an end of vertical leg 516CV, and fourth conductive layer 516D further comprises a module contact tab 528D coupled to an end of vertical leg 516DV. Module contact tabs 528A-528D may be configured to be electrically coupled to various terminals on battery modules 300, thereby permitting current to flow between battery modules 300 and junction box 600 through conductive layers 516A-516D. In various embodiments, module contact tabs 528A-528D may be electrically coupled to multiple battery modules 300 adjacent to a corner of battery enclosure 202 formed by first side panel 204 and fourth side panel 210.

In various embodiments, first bridge busbar 504, second bridge busbar 506, third bridge busbar 508, fourth bridge busbar 510, fifth bridge busbar 512, and sixth bridge busbar 514 are configured to be electrically coupled to at least two battery modules 300. First bridge busbar 504 comprises a first module contact tab 504A and a second module contact tab 504B configured to be electrically coupled to two different battery modules 300. Second bridge busbar 506 comprises a first module contact tab 506A and a second module contact tab 506B configured to be electrically coupled to two different battery modules 300. Third bridge busbar 508 comprises a first module contact tab 508A and a second module contact tab 508B configured to be electrically coupled to two different battery modules 300. Fourth bridge busbar 510 comprises a first module contact tab 510A and a second module contact tab 510B configured to be electrically coupled to two different battery modules 300. Fifth bridge busbar 512 comprises a first module contact tab 512A and a second module contact tab 512B configured to be electrically coupled to two different battery modules 300. Finally, sixth bridge busbar 514 comprises a first module contact tab 514A and a second module contact tab 514B configured to be electrically coupled to two different battery modules 300.

First bridge busbar 504, third bridge busbar 508, and fourth bridge busbar 510 may be electrically coupled to battery modules 300 adjacent to a corner of battery enclosure 202 formed by second side panel 206 and third side panel 208. Second bridge busbar 506 and fifth bridge busbar 512 may be electrically coupled to battery modules 300 adjacent to the corner of battery enclosure 202 formed by first side panel 204 and fourth side panel 210. Sixth bridge busbar 514 may be electrically coupled to battery modules 300 adjacent to a corner of battery enclosure 202 formed by fourth side panel 210 and top panel 214.

In various embodiments, first bridge busbar 504, second bridge busbar 506, third bridge busbar 508, fourth bridge busbar 510, and fifth bridge busbar 512 may each comprise similar structures which may differ from a structure of sixth bridge busbar 514. For example, each of first bridge busbar 504, second bridge busbar 506, third bridge busbar 508, fourth bridge busbar 510, and fifth bridge busbar 512 may comprise an arch 530 configured to permit intermediate lines 410 of battery pack thermal system 400 to be placed between arch 530 and battery module 300, thereby permitting efficient packaging of battery pack thermal system 400 within battery enclosure 202. In contrast, sixth bridge busbar 514 comprises an elongated strip of material 532 extending a substantial portion of the distance between first side panel 204 and second side panel 206 with first module contact tab 514A and second module contact tab 514B extending downward (negative Z-direction as illustrated).

With additional reference to FIGS. 5D and 5E, electrical contact assembly 500 is configured to permit current to flow between junction box 600 and battery modules 300. For example, current may flow into junction box 600 and into battery modules 300 in order to charge the plurality of battery cells in battery modules 300 when battery pack assembly 200 is charging. During discharge, current may flow from battery modules 300 to junction box 600 and out of junction box 600 to power electric vehicle 100 high voltage systems. In various embodiments, the battery modules 300 may be electrically coupled in series to allow voltage between the various battery modules to be added.

More specifically, during charging, current flows from an external power source (such as a DC fast charging system) into junction box 600 and from junction box 600 to junction box contact tab 526B. Current flows from junction box contact tab 526B to horizontal leg 516BH of second conductive layer 516B of laminated busbar assembly 502. Current flows from horizontal leg 516BH to vertical leg 516BV and through vertical leg 516BV to module contact tab 528B. In various embodiments, module contact tab 528B is electrically coupled to a positive terminal of first battery module 300-1. Following this, current flows from the positive terminal of first battery module 300-1 to a negative terminal of first battery module 300-1 and into first module contact tab 504A of first bridge busbar 504. In various embodiments, first module contact tab 504A of first bridge busbar 504 is electrically coupled to the negative terminal of first battery module 300-1. Current then flows from first module contact tab 504A to second module contact tab 504B of first bridge busbar 504.

In various embodiments, second module contact tab 504B of first bridge busbar 504 is electrically coupled to a positive terminal of second battery module 300-2. Current flows from the positive terminal of second battery module 300-2 to a negative terminal of second battery module 300-2 and into first module contact tab 506A of second bridge busbar 506. First module contact tab 506A of second bridge busbar 506 is electrically coupled to the negative terminal of second battery module 300-2. Current flows from the first module contact tab 506A to the second module contact tab 506B of second bridge busbar 506.

In various embodiments, second module contact tab 506B of second bridge busbar 506 is electrically coupled to a positive terminal of third battery module 300-3. Current flows from the positive terminal of third battery module 300-3 to a negative terminal of third battery module 300-3 and into first module contact tab 508A of third bridge busbar 508. First module contact tab 508A of third bridge busbar 508 is electrically coupled to the negative terminal of third battery module 300-3. Current flows from the first module contact tab 508A to the second module contact tab 508B of third bridge busbar 508.

In various embodiments, second module contact tab 508B of third bridge busbar 508 is electrically coupled to a positive terminal of fourth battery module 300-4. Current flows from the positive terminal of fourth battery module 300-4 to a negative terminal of fourth battery module 300-4 and into module contact tab 528D of laminated busbar assembly 502. In various embodiments, module contact tab 528D is electrically coupled to the negative terminal of fourth battery module 300-4. Current flows from module contact tab 528D, through vertical leg 516DV of fourth conductive layer 516D, through horizontal leg 516DH of fourth conductive layer 516D, through junction box contact tab 526D, and into junction box 600. As will be discussed in further detail below, junction box 600 may be configured to permit current to flow through a closed circuit partially formed by the internal components of junction box 600 or may be configured to prevent current flow by opening a circuit via one or more internal components of junction box 600.

When in a closed-circuit configuration, current flows from fourth junction box contact tab 526D, through one or more internal components of junction box 600 (discussed in detail in relation to FIGS. 8A-8D), and into junction box contact tab 526C. Current flows from junction box contact tab 526C, through horizontal leg 516CH of third conductive layer 516C, through vertical leg 516CV of third conductive layer 516C, and into module contact tab 528C of laminated busbar assembly 502. In various embodiments, module contact tab 528C of laminated busbar assembly 502 is electrically coupled to a positive terminal of fifth battery module 300-5. Current flows from the positive terminal of fifth battery module 300-5 to a negative terminal of fifth battery module 300-5 and into first module contact tab 510A of fourth bridge busbar 510. First module contact tab 510A of fourth bridge busbar 510 is electrically coupled to the negative terminal of fifth battery module 300-5. Current flows from the first module contact tab 510A to the second module contact tab 510B of fourth bridge busbar 510.

In various embodiments, second module contact tab 510B of fourth bridge busbar 510 is electrically coupled to a positive terminal of sixth battery module 300-6. Current flows from the positive terminal of sixth battery module 300-6 to a negative terminal of sixth battery module 300-6 and into first module contact tab 512A of fifth bridge busbar 512. First module contact tab 512A of fifth bridge busbar 512 is electrically coupled to the negative terminal of sixth battery module 300-6. Current flows from the first module contact tab 512A to the second module contact tab 512B of fifth bridge busbar 512.

In various embodiments, second module contact tab 512B of fifth bridge busbar 512 is electrically coupled to a positive terminal of seventh battery module 300-7. Current flows from the positive terminal of seventh battery module 300-7 to a negative terminal of seventh battery module 300-7 and into first module contact tab 514A of sixth bridge busbar 514. First module contact tab 514A of sixth bridge busbar 514 is electrically coupled to the negative terminal of seventh battery module 300-7. Current flows from the first module contact tab 514A to the second module contact tab 514B of sixth bridge busbar 514.

In various embodiments, second module contact tab 514B of sixth bridge busbar 514 is electrically coupled to a positive terminal of eighth battery module 300-8. Current flows from the positive terminal of eighth battery module 300-8 to a negative terminal of eighth battery module 300-8 and into module contact tab 528A of laminated busbar assembly 502. Module contact tab 528A of laminated busbar assembly 502 is electrically coupled to the negative terminal of eighth battery module 300-8. From module contact tab 528A, current flows through vertical leg 516AV of first conductive layer 516, through horizontal leg 516AH of first conductive layer 516, and into junction box contact tab 526A.

While discussed above with respect to charging of battery pack assembly 200, it should be appreciated that electrical contact assembly 500 may be configured to permit current flow during discharge in a substantially similar manner. For example, electrical energy may be generated in each battery module 300-1 through 300-8 and current may travel through the various bridge busbars 504-514 and laminated busbar assembly 502 and out of junction box 600 to power high voltage systems of electric vehicle 100. However, for the sake of brevity, detailed discussion of current flow during discharge of battery pack assembly 200 will not be repeated.

Referring now to FIGS. 8A-8D, junction box 600 is illustrated detached from battery pack assembly 200, in accordance with various embodiments. As illustrated in FIGS. 8A-8D, junction box panel 218 is removed to allow for clear discussion of the internal components of junction box 600. In various embodiments, junction box 600 comprises a first positive high voltage connector 602, a second positive high voltage connector 604, a first negative high voltage connector 606, a second negative high voltage connector 608, and a communications connector 610. As used herein in relation to first positive high voltage connector 602, second positive high voltage connector 604, first negative high voltage connector 606, and second negative high voltage connector 608, the terms "positive" and "negative" are for reference only and do not necessarily refer to polarity of the various high voltage connectors.

In various embodiments, communications connector 610 is configured to receive a counterpart communication connector (for example, vehicle communication connector 138) configured to be in electrical communication with one or more electric vehicle 100 control modules such as a front or rear power distribution unit, battery management system, crash sensor electronic control unit, and/or vehicle control unit. In various embodiments, communications connector 610 may be in wired or wireless communication with a miniature circuit breaker (MCB) 612 configured to turn off (or open) or on (or close) one or more electric circuits in battery pack assembly 200 in response to a measured overload or short circuit condition, for example. In various embodiments, communications connector 610, MCB 612, and the vehicle control modules may be configured to communicate through a message-based protocol such as a CAN bus protocol.

In various embodiments, first negative high voltage connector 606 and second negative high voltage connector 608 are positioned between first positive high voltage connector 602 and second positive high voltage connector 604. Such placement of the various high voltage connectors permits the use of one or more compact busbars within junction box 600. Stated otherwise, the positioning of the high voltage connectors (e.g., +, −, −, +) permits a single busbar to be electrically coupled to first positive high voltage connector 602 and second positive high voltage connector 604, and a single busbar to be electrically coupled to first negative high voltage connector 606 and second negative high voltage connector 608 without the need to overlap the busbars as may be required in an alternative configuration (for example, +, +, − or −, +, +). In various embodiments, each of first positive high voltage connector 602, second positive high voltage connector 604, first negative high voltage connector 606, and second negative high voltage connector 608 may comprise a female socket connector configured to receive a male plug connector from one or more high voltage cables; however, the various high voltage connectors are not limited in this regard and may comprise connectors of any suitable type.

Junction box 600 comprises a first busbar 614 configured to be electrically coupled to first positive high voltage connector 602 and second positive high voltage connector 604. In various embodiments, first busbar 614 comprises a first leg 614A configured to be electrically coupled to first positive high voltage connector 602 and a second leg 614B configured to be electrically coupled to second positive high voltage connector 604. First busbar 614 further comprises a third leg 614C configured to be electrically coupled to a first portion of a first contactor 616. In various embodiments, first contactor 616 may comprise a normally open contactor that does not allow current to flow when first contactor 616 is in a deenergized state. However, first contactor 616 is not limited in this regard and may comprise a normally closed contactor that opens a circuit in response to an electrical signal. In various embodiments, first contactor 616 comprises an internal electromagnet configured to actuate in response to an electrical signal, thereby closing a circuit and allowing current to flow from the first portion of first contactor 616 to a second portion of first contactor 616, or vice versa.

Junction box 600 further comprises a second busbar 618 configured to be electrically coupled to first negative high voltage connector 606 and second negative high voltage connector 608. For example, in various embodiments, second busbar 618 comprises a first leg 618A configured to be electrically coupled to first negative high voltage connector 606 and a second leg 618B configured to be electrically coupled to second negative high voltage connector 608. Second busbar 618 further comprises a third leg 618C configured to be electrically coupled to a first portion of a second contactor 620. In various embodiments, second contactor 620 may comprise a normally open contact that does not allow current to flow when second contactor 620 is in a deenergized state. However, second contactor 620 is not limited in this regard and may comprise a normally closed contactor that opens a circuit in response to an electrical signal. Similar to first contactor 616, second contactor 620 may comprise an internal electromagnet configured to actuate in response to an electrical signal, thereby closing a circuit and allowing current to flow from the first portion of second contactor 620 to a second portion of second contactor 620, or vice versa.

Junction box 600 further comprises a plurality of throughput busbars. For example, in various embodiments, junction box 600 further comprises a first throughput busbar 622, a second throughput busbar 624, a third throughput busbar 626, and a fourth throughput busbar 628. Each throughput busbar 622-628 may be electrically coupled to a corresponding transition busbar in various embodiments. More specifically, with momentary reference to FIG. 7D, junction box 600 further comprises a first transition busbar 630, a second transition busbar 632, a third transition busbar 634, and a fourth transition busbar 636. A first portion of first transition busbar 630 is electrically coupled to first throughput busbar 622 and a second portion of first transition busbar 630 is electrically coupled to junction box contact tab 526A. A first portion of second transition busbar 632 is electrically coupled to second throughput busbar 624 and a second portion of second transition busbar 632 is electrically coupled to junction box contact tab 526B. A first portion of third transition busbar 634 is electrically coupled to third throughput busbar 626 and a second portion of third transition busbar 634 is electrically coupled to junction box contact tab 526C. Finally, a first portion of fourth transition busbar 636 is electrically coupled to fourth throughput busbar 628 and a second portion of fourth transition busbar 636 is electrically coupled to junction box contact tab 526D. While discussed herein as comprising a plurality of transition busbars 630-636, battery pack assembly 200 is not limited in this regard and may be devoid of the plurality of transition busbars in various embodiments. For example, each throughput busbar 622-628 may be electrically coupled directly to the corresponding junction box contact tab 526A-526D without an intermediate transition busbar in various embodiments.

In various embodiments, a first portion of first throughput busbar 622 is electrically coupled to the first portion of first transition busbar 630 and a second portion of first throughput busbar 622 is electrically coupled to a current sensor 638. Current sensor 638 is further electrically coupled to a second portion of second contactor 620 via a third busbar 640. Current sensor 638 may be configured to detect and measure current flowing from first throughput busbar 622 through current sensor 638 to second contactor 620. In various embodiments, current sensor 638 may be in electrical communication with MCB 612 such that MCB 612 may turn off power to or from battery pack assembly 200 in the event current sensed by current sensor 638 deviates from expected values. For example, in the event of a detected current deviation measured by current sensor 638, MCB 612 may send a signal to deenergize second contactor 620, thereby creating an opening in the circuit between first throughput busbar 622 and components downstream of second contactor 620, such as second busbar 618, first negative high voltage connector 606, and second negative high voltage connector 608.

A first portion of second throughput busbar 624 is electrically coupled to the first portion of second transition busbar 632 and a second portion of second throughput busbar 624 is electrically coupled to a fourth busbar 642. In various embodiments, a first portion of fourth busbar 642 is electrically coupled to the second portion of second throughput busbar 624 and a second portion of fourth busbar 642 is electrically coupled to a second portion of first contactor 616. Similar to second contactor 620, first contactor 616 may be deenergized in response to a signal from MCB 612, thereby creating an opening in the circuit between fourth busbar 642 and components downstream of first contactor 616, such as first busbar 614, first positive high voltage connector 602, and second positive high voltage connector 604.

A first portion of third throughput busbar 626 is electrically coupled to the first portion of third transition busbar 634 and a second portion of third throughput busbar 626 is electrically coupled to a fifth busbar 644. A first portion of fourth busbar 642 is electrically coupled to the second portion of third throughput busbar 626 and a second portion of fifth busbar 644 is electrically coupled to a first portion of a pyro fuse 646. Pyro fuse 646 may comprise an internal pyrotechnic initiator configured to actuate an internal piston configured to sever an internal busbar of pyro fuse 646 in order to open the electrical circuit extending through pyro fuse 646. In various embodiments, pyro fuse 646 may be actuated in response to a signal from MCB 612, a battery management system, a crash sensor electronic control unit, or some other system indicating an issue in battery pack assembly 200, indicating that electric vehicle 100 has been in an accident and the high voltage systems need to be disconnected, or indicating overcharging of battery pack assembly 200, for example.

In various embodiments, junction box 600 further comprises a sixth busbar 648. A first portion of sixth busbar 648 is electrically coupled to a second portion of pyro fuse 646 and a second portion of sixth busbar 648 is electrically coupled to a first portion of a manual service disconnect (MSD) 650. MSD 650 is further electrically coupled to fourth transition busbar 636 through fourth throughput busbar 628. In various embodiments, MSD 650 may be configured to permit service technicians to service battery pack assembly 200 and/or electric vehicle 100 safely by minimizing the risk of electrocution. For example, prior to servicing battery pack assembly 200 or electric vehicle 100, a service technician may manually decouple a first portion of MSD 650 coupled to a second portion of MSD 650, thereby creating an open circuit between sixth busbar 648 and fourth throughput busbar 628. As a result, current may be prevented from flowing throughout junction box 600 and/or battery pack assembly 200 as service is conducted on battery pack assembly 200 or electric vehicle 100. In various embodiments, battery enclosure 202 comprises an MSD thermal panel which may comprise a similar material to any of first side panel 204, second side panel 206, third side panel 208, fourth side panel 210, top panel 214, bottom panel 216, or junction box panel 218. In various embodiments, the MSD thermal panel may comprise a material similar to the thermal barrier material discussed above. The MSD thermal panel may be configured to shield MSD 650 from flames propagating from adjacent battery pack assemblies, for example.

Junction box 600 further comprises a pre-charge circuit 652. In various embodiments, pre-charge circuit 652 comprises a resistor, a contactor, and a fuse electrically coupled in series. In various embodiments, pre-charge circuit 652 may be electrically coupled in parallel with first contactor 616. Pre-charge circuit 652 may be configured to limit inrush current during power up of electric vehicle 100 or battery pack assembly 200, as initial current levels could stress or damage one or more electrical components of junction box 600 or battery pack assembly 200, including first contactor 616 or battery cells present in battery modules 300. During startup, first contactor 616 may be open, thereby directing current to pre-charge circuit 652. MCB 612 and/or current sensor 638 may measure and/or monitor current values throughout battery pack assembly 200 and determine when the inrush current subsides. At this stage, the contactor of pre-charge circuit 652 may be opened and first contactor 616 closed in order to permit current to flow throughout battery pack assembly 200 at safe and/or rated current levels.

Having discussed the various components of junction box 600 briefly, current flow through junction box 600 will now be discussed. In various embodiments, current may be configured to flow from a first high voltage component and into first positive high voltage connector 602 or second positive high voltage connector 604, which may interchangeably act as current inputs or outputs. In various embodiments, battery pack assembly 200 and the first high voltage component may be connected in series or in parallel. Depending on the state of battery pack assembly 200, current flowing into first positive high voltage connector 602 (or second positive high voltage connector 604) may be directed by first busbar 614 out of second positive high voltage connector 604 and/or directed into first contactor 616 or pre-charge circuit 652. For example, in various embodiments, all current may flow out of second positive high voltage connector 604 (or first positive high voltage connector 602), all current may flow into first contactor 616 and/or pre-charge circuit 652, or a first amount of current can be directed to second positive high voltage connector 604 (or first positive high voltage connector 602) and a second amount of current can be directed to first contactor 616 and/or pre-charge circuit 652. Current may be directed to a second high voltage component when directed out of second positive high voltage connector 604 (or first positive high voltage connector 602) or combined with electricity generated from battery modules 300 when directed through first contactor 616 and throughout battery pack assembly 200.

As previously stated, current flowing through first busbar 614 may be directed to first contactor 616 and/or pre-charge circuit 652. In various embodiments, all current may be directed to pre-charge circuit 652, all current may be directed to first contactor 616, or a first amount of current may be directed to pre-charge circuit 652 and a second amount of current may be directed to first contactor 616. During vehicle startup, first contactor 616 may be open and a majority of the current may be directed to pre-charge circuit 652 whose contactor may be closed. After vehicle start-up, the contactor associated with pre-charge circuit 652 may be open and first contactor 616 may be closed, thereby permitting current to continue flowing through other portions of battery pack assembly 200.

When first contactor 616 is closed, current may flow from first busbar 614 through first contactor 616 and into fourth busbar 642. Current may flow from fourth busbar 642, into second throughput busbar 624, and into second transition busbar 632. From second transition busbar 632, current may flow into junction box contact tab 526B and through battery modules 300-1 through 300-4 as discussed in relation to FIGS. 5D-5E and FIGS. 7A-7E.

As discussed above, after flowing through battery modules 300-1 through 300-4, current may flow through junction box contact tab 526D and into fourth transition busbar 636. Current may then flow from fourth transition busbar 636, into fourth throughput busbar 628, and into MSD 650. When the first portions and second portions of MSD 650 are coupled (thereby completing the circuit between fourth throughput busbar 628 and fifth busbar 644), current may flow from MSD 650, into sixth busbar 648, and into pyro fuse 646. When intact (thereby completing the circuit between sixth busbar 648 and fifth busbar 644), current may flow from pyro fuse 646 into fifth busbar 644, through third throughput busbar 626, through third transition busbar 634 and into junction box contact tab 526C.

As discussed above, current may flow from junction box contact tab 526C, through battery modules 300-5 through 300-8, and into junction box contact tab 526A. From junction box contact tab 526A, current may flow into first transition busbar 630, through first throughput busbar 622 and into current sensor 638. From current sensor 638, current may flow into third busbar 640 and into second contactor 620. When energized (and therefore closing the circuit between third busbar 640 and second busbar 618), current may flow into second busbar 618 and out of first negative high voltage connector 606 or second negative high voltage connector 608, which may interchangeably act as current inputs or outputs in various embodiments. In situations where battery pack assembly 200 is disconnected or needs to be bypassed, current from a first high voltage component or system may flow through first negative high voltage connector 606 (or second negative high voltage connector 608) and out of second negative high voltage connector 608 (or first negative high voltage connector 606) to a second high voltage component. As such, current may be configured to continuously flow throughout the high voltage systems of electric vehicle 100 despite one or more battery pack assemblies 200 being disconnected or bypassed.

As discussed above, the "first high voltage component" and the "second high voltage component" may comprise an upstream or downstream battery pack assembly similar to battery pack assembly 200, a front or rear power distribution unit, an inverter, an electric motor, or other high voltage component of electric vehicle 100.

In various embodiments, any or all of the busbars mentioned above (including laminated busbar assembly 502, first bridge busbar 504, second bridge busbar 506, third bridge busbar 508, fourth bridge busbar 510, fifth bridge busbar 512, sixth bridge busbar 514, first busbar 614, second busbar 618, first throughput busbar 622, second throughput busbar 624, third throughput busbar 626, fourth throughput busbar 628, first transition busbar 630, second transition busbar 632, third transition busbar 634, fourth transition busbar 636, third busbar 640, fourth busbar 642, fifth busbar 644, and sixth busbar 648) comprise a thermal sleeve or thermal coating configured to prevent the various busbars from contacting each other as a result of damage to surrounding support structures caused by a fire, for example. In various embodiments, the thermal sleeves and/or thermal coatings may comprise any material having a low coefficient of thermal conductivity, low coefficient of electrical conductivity, and high melt and ignition temperature. In various embodiments, the thermal sleeves and/or thermal coatings may comprise a silicone rubber, epoxy, polyolefin, or other suitable material.

EXAMPLES

Examples 1-7—Battery Pack Assembly

In Example 1, a battery pack assembly comprises: a battery enclosure comprising a first side panel, a second side panel, a third side panel, a fourth side panel, a top panel, and a bottom panel defining a module containing volume, and a first battery module, a second battery module, and a third battery module in the module containing volume, wherein the first battery module and the second battery module are positioned in a first orientation and stacked to form a column of battery modules, and wherein the third battery module is positioned in a second orientation and positioned adjacent to the column of battery modules.

In Example 2, the battery pack assembly of Example 1, wherein the third battery module is oriented at an angle of substantially 90 degrees relative to the first battery module and the second battery module.

In Example 3, the battery pack assembly of Example 2, wherein the angle is relative to an axis extending through the battery pack assembly that is parallel to the first side panel, the second side panel, the top panel, and the bottom panel and orthogonal to the third side panel and the fourth side panel.

In Example 4, the battery pack assembly of Example 1, further comprising a vertically oriented, internal dividing panel positioned between the column of battery modules and the third battery module.

In Example 5, the battery pack assembly of Example 1, further comprising a fourth battery module positioned in the first orientation and above the second battery module, a fifth battery module positioned in the first orientation and above the fourth battery module, a sixth battery module positioned in the first orientation and above the fifth battery module, a seventh battery module positioned in the first orientation and above the sixth battery module, and an eighth battery module positioned in the first orientation and above the seventh battery module.

In Example 6, the battery pack assembly of Example 5, wherein the third battery module overlaps at least a portion of the fourth battery module, the fifth battery module, the sixth battery module, the seventh battery module, and the eighth battery module in a vertical direction.

In Example 7, the battery pack assembly of Example 1, further comprising a horizontally oriented, internal dividing panel coupled to and extending between the vertically oriented, internal dividing panel and the second side panel.

Examples 8-15—Battery Pack Assembly

In Example 8, a battery pack assembly comprises: a battery enclosure comprising a plurality of side panels, a top panel, and a bottom panel defining a module containing volume, and a first battery module, a second battery module, a third battery module, a fourth battery module, a fifth battery module, a sixth battery module, a seventh battery module, and an eighth battery module in the module containing volume, wherein the first battery module through the fourth battery module are electrically coupled in series to form a first module subassembly, wherein the fifth battery module through the eighth battery module are electrically coupled in series to form a second module subassembly, wherein the first module subassembly and the second module subassembly are electrically coupled in series, and wherein the battery pack assembly is configured with a voltage of between 700 volts and 900 volts.

In Example 9, the battery pack assembly of Example 8, wherein the battery pack assembly is configured with a capacity of between 100 amp-hours (Ah) and 130 Ah and with a net energy of between 40 kilowatt-hours (kWh) and 120 kWh.

In Example 10, the battery pack assembly of claim 8, wherein the first battery module is positioned above the bottom panel, the second battery module is positioned above the first battery module, the third battery module is positioned above the second battery module, and the fourth battery module is positioned above the third battery module.

In Example 11, the battery pack assembly of Example 10, wherein the fifth battery module is positioned above the fourth battery module, the sixth battery module is positioned above the fifth battery module, the seventh battery module is positioned above the sixth battery module and below the top panel, and the eighth battery module is positioned horizontally adjacent to at least one of the fifth battery module, the sixth battery module, or the seventh battery module.

In Example 12, the battery pack assembly of Example 8, wherein the eighth battery module is oriented at an angle of substantially 90 degrees relative to each of the first battery module, the second battery module, the third battery module, the fourth battery module, the fifth battery module, the sixth battery module, and the seventh battery module.

In Example 13, the battery pack assembly of Example 12, wherein the angle is relative to an axis extending through the battery pack assembly that is parallel to the top panel and the bottom panel and orthogonal to at least two side panels of the plurality of side panels.

In Example 14, the battery pack assembly of Example 8, wherein the plurality of side panels comprises a first side panel, a second side panel opposite the first side panel, a third side panel substantially orthogonal to the first side panel and the second side panel, and a fourth side panel substantially orthogonal to the first side panel and the second side panel.

In Example 15, the battery pack assembly of Example 14, wherein the third side panel and the fourth side panel are mirrored about a vertical plane which is parallel with the third side panel and the fourth side panel and which bisects the first side panel and the fourth side panel.

Examples 16-20—Battery Pack Assembly

In Example 16, a battery pack assembly comprises: a battery enclosure comprising a plurality of side panels, a top panel, and a bottom panel defining a module containing volume containing a plurality of battery modules, and a battery pack thermal system, comprising: a first manifold comprising a pack inlet, a first main line, a first manifold body, a first plurality of intermediate lines, a first plurality of distribution lines, and a plurality of manifold outlets, and a second manifold comprising a pack outlet, a second main line, a second manifold body, a second plurality of intermediate lines, a second plurality of distribution lines, and a plurality of manifold inlets, wherein the first manifold is fluidly coupled to the plurality of battery modules via the plurality of manifold outlets to deliver a battery coolant to the plurality of battery modules, and wherein the second manifold is fluidly coupled to the plurality of battery modules via the plurality of manifold inlets to receive the battery coolant from the plurality of battery modules.

In Example 17, the battery pack assembly of Example 16, wherein the pack inlet is positioned vertically below the pack outlet on a side panel of the plurality of side panels.

In Example 18, the battery pack assembly of Example 16, wherein the plurality of battery modules comprises eight battery modules.

In Example 19, the battery pack assembly of Example 18, wherein the first plurality of distribution lines comprises sixteen distribution lines with two distribution lines fluidly coupled to each battery module of the plurality of battery modules, and wherein the second plurality of distribution lines comprises sixteen distribution lines with two distribution lines fluidly coupled to each battery module of the plurality of battery modules.

In Example 20, the battery pack assembly of Example 16, wherein the plurality of manifold inlets are fluidly coupled to a first side of the plurality of battery modules and the plurality of manifold outlets are fluidly coupled to a second side of the plurality of battery modules.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A battery pack assembly, comprising:
   a battery enclosure comprising a first side panel, a second side panel, a third side panel, a fourth side panel, a junction box panel, a top panel, and a bottom panel defining a module containing volume;
   a vertically oriented, internal dividing panel coupled to the top panel and the bottom panel and located in the module containing volume;
   a horizontally oriented, internal dividing panel coupled to the vertically oriented, internal dividing panel and the first side panel and located in the module containing volume;
   a junction box coupled to the junction box panel and comprising a first high voltage connector, a second high voltage connector, a third high voltage connector, a fourth high voltage connector, and a communications connector; and
   a first battery module positioned above the bottom panel, a second battery module positioned above the first battery module, a third battery module positioned above the second battery module, a fourth battery module positioned above the third battery module, a fifth battery module positioned above the fourth battery module, a sixth battery module positioned above the fifth battery module, a seventh battery module positioned above the sixth battery module, and an eighth battery module adjacent to the third battery module, the fourth battery module, the fifth battery module, the sixth battery module, and the seventh battery module,
   wherein the first battery module through the seventh battery module are positioned in a first orientation and stacked to form a column of battery modules, and
   wherein the eighth battery module is positioned in a second orientation at an angle of substantially 90 degrees relative to the column of battery modules and positioned between the vertically oriented, internal dividing panel and the first side panel and positioned between the horizontally oriented, internal dividing panel and the top panel.

2. The battery pack assembly of claim 1, wherein the angle is relative to an axis extending through the battery pack assembly that is parallel to the first side panel, the second side panel, the top panel, and the bottom panel and orthogonal to the third side panel and the fourth side panel.

3. The battery pack assembly of claim 1, wherein the junction box is located beneath the eighth battery module.

4. The battery pack assembly of claim 1, further comprising a battery pack thermal system configured to provide a coolant to the first battery module, the second battery module, the third battery module, the fourth battery module, the fifth battery module, the sixth battery module, the seventh battery module, and the eighth battery module.

5. The battery pack assembly of claim 1, wherein the first side panel and the second side panel each comprise at least one mounting bracket configured to be coupled to a battery frame assembly of an electric vehicle.

6. The battery pack assembly of claim 1, wherein the first battery module, the second battery module, the third battery module, the fourth battery module, the fifth battery module, the sixth battery module, the seventh battery module, and the eighth battery module are electrically coupled in series.

7. The battery pack assembly of claim 1, wherein the battery pack assembly is configured with a capacity of between 100 amp-hours (Ah) and 130 Ah and with a net energy of between 40 kilowatt-hours (kWh) and 120 kWh.

8. A battery enclosure, comprising:
   a first side panel;
   a second side panel spaced apart from and substantially parallel to the first side panel;
   a third side panel coupled to the first side panel and the second side panel;
   a fourth side panel spaced apart from the third side panel and coupled to the first side panel and the second side panel;
   a top panel substantially orthogonal to the first side panel, the second side panel, the third side panel, and the fourth side panel and coupled to the first side panel, the second side panel, the third side panel, and the fourth side panel;
   a bottom panel substantially orthogonal to the first side panel, the second side panel, the third side panel, and the fourth side panel and coupled to the first side panel, the second side panel, the third side panel, and the fourth side panel; and
   a junction box panel comprising a top flange and a bottom flange, wherein the bottom flange is coupled to the bottom panel and the top flange is coupled to the first side panel,
   wherein the junction box panel is oriented at a first angle relative to the bottom panel and a second angle relative to the first side panel.

9. The battery enclosure of claim 8, further comprising a vertically oriented, internal dividing panel coupled to the top panel and the bottom panel.

10. The battery enclosure of claim 9, further comprising a horizontally oriented, internal dividing panel coupled to the vertically oriented, internal dividing panel and the first side panel.

11. The battery enclosure of claim 8, wherein the third side panel is substantially orthogonal to the fourth side panel.

12. The battery enclosure of claim 8, wherein the first angle is between 110 and 120 degrees and the second angle is between 150 and 160 degrees.

13. The battery enclosure of claim 8, wherein at least a portion of the junction box panel is substantially aligned with the first side panel when viewed from a direction normal to the fourth side panel.

14. A battery pack assembly, comprising:
   a battery enclosure comprising a plurality of panels and defining a module containing volume;
   a plurality of battery modules in the module containing volume;
   a junction box coupled to the plurality of panels and comprising a first high voltage connector, a second high voltage connector, a third high voltage connector, a fourth high voltage connector, a manual service disconnect (MSD), and a pyro fuse; and
   a laminated busbar assembly, comprising:
      a first conductive layer electrically coupled to the first high voltage connector and the second high voltage connector;
      a second conductive layer electrically coupled to the third high voltage connector and the fourth high voltage connector;
      a third conductive layer electrically coupled to the pyro fuse; and
      a fourth conductive layer electrically coupled to the MSD,
   wherein the first conductive layer is configured to receive current from the plurality of battery modules and deliver current to at least one of the first high voltage connector and the second high voltage connector,
   wherein the second conductive layer is configured to receive current from at least one of the third high voltage connector and the fourth high voltage connector and deliver current to the plurality of battery modules, and
   wherein the fourth conductive layer is configured to receive current from the plurality of battery modules and deliver current to the third conductive layer through the pyro fuse and the MSD.

15. The battery pack assembly of claim 14, further comprising a first contactor electrically coupled to the third high voltage connector and the fourth high voltage connector.

16. The battery pack assembly of claim 15, further comprising a second contactor electrically coupled to the first high voltage connector and the second high voltage connector.

17. The battery pack assembly of claim 16, wherein the second contactor is electrically coupled to a current sensor that is electrically coupled to the first conductive layer of the laminated busbar assembly.

18. The battery pack assembly of claim 14, wherein the first conductive layer comprises a horizontal leg and a vertical leg, the second conductive layer comprises a horizontal leg and a vertical leg, the third conductive layer comprises a horizontal leg and a vertical leg, and the fourth conductive layer comprises a horizontal leg and a vertical leg.

19. The battery pack assembly of claim 14, wherein the junction box further comprises a pre-charge circuit configured to limit inrush current into the battery pack assembly.

20. The battery pack assembly of claim 14, wherein the pyro fuse and the MSD are electrically coupled via a busbar.

* * * * *